(12) United States Patent
Wilson et al.

(10) Patent No.: US 7,665,041 B2
(45) Date of Patent: Feb. 16, 2010

(54) ARCHITECTURE FOR CONTROLLING A COMPUTER USING HAND GESTURES

(75) Inventors: Andrew D. Wilson, Seattle, WA (US); Nuria M. Oliver, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1034 days.

(21) Appl. No.: 10/396,653

(22) Filed: Mar. 25, 2003

(65) Prior Publication Data

US 2004/0189720 A1 Sep. 30, 2004

(51) Int. Cl.
G06F 3/048 (2006.01)
G06F 3/033 (2006.01)

(52) U.S. Cl. .................... 715/860; 715/863

(58) Field of Classification Search .......... 715/863, 715/860

See application file for complete search history.

(56) References Cited

U.S. PATENT DOCUMENTS

| | | | |
|---|---|---|---|
| 5,528,263 A | 6/1996 | Platzker et al. | |
| 5,616,078 A | 4/1997 | Oh | |
| 5,801,704 A | 9/1998 | Oohara et al. | |
| 5,828,779 A | 10/1998 | Maggioni | |
| 6,002,808 A * | 12/1999 | Freeman | 382/288 |
| 6,111,580 A | 8/2000 | Kazama et al. | |
| 6,215,890 B1 * | 4/2001 | Matsuo et al. | 382/103 |
| 6,222,465 B1 | 4/2001 | Kumar et al. | |
| 6,226,388 B1 * | 5/2001 | Qian et al. | 382/103 |
| 6,377,296 B1 | 4/2002 | Zlatsin et al. | |
| 6,421,453 B1 | 7/2002 | Kanevsky et al. | |
| 6,476,834 B1 | 11/2002 | Doval et al. | |
| 6,591,236 B2 | 7/2003 | Lewis et al. | |
| 6,594,616 B2 | 7/2003 | Zhang et al. | |
| 6,750,848 B1 | 6/2004 | Pryor | |
| 6,868,383 B1 * | 3/2005 | Bangalore et al. | 704/254 |
| 7,007,236 B2 | 2/2006 | Dempski et al. | |
| 7,036,094 B1 * | 4/2006 | Cohen et al. | 715/863 |
| 7,227,526 B2 | 6/2007 | Hildreth et al. | |
| 2002/0041327 A1 * | 4/2002 | Hildreth et al. | 348/42 |
| 2004/0056907 A1 * | 3/2004 | Sharma et al. | 345/863 |

(Continued)

OTHER PUBLICATIONS

Sharma et al., "Method of Visual and acoustic signal co-analys for co-verbal gesture recognition"; 20020919, USPTO U.S. Appl. No. 60/413,998.*

(Continued)

*Primary Examiner*—William L Bashore
*Assistant Examiner*—Jordany Núñez
(74) *Attorney, Agent, or Firm*—Lee & Hayes, PLLC

(57) ABSTRACT

Architecture for implementing a perceptual user interface. The architecture comprises alternative modalities for controlling computer application programs and manipulating on-screen objects through hand gestures or a combination of hand gestures and verbal commands. The perceptual user interface system includes a tracking component that detects object characteristics of at least one of a plurality of objects within a scene, and tracks the respective object. Detection of object characteristics is based at least in part upon image comparison of a plurality of images relative to a course mapping of the images. A seeding component iteratively seeds the tracking component with object hypotheses based upon the presence of the object characteristics and the image comparison. A filtering component selectively removes the tracked object from the object hypotheses and/or at least one object hypothesis from the set of object hypotheses based upon predetermined removal criteria.

33 Claims, 13 Drawing Sheets

U.S. PATENT DOCUMENTS

2004/0113933 A1* 6/2004 Guler .................... 345/716

OTHER PUBLICATIONS

Azoz et al., "Reliable tracking of human arm dynamics by multiple cue integration and constraint fusion", IEEE Conference on Computer Vision and Pattern Recognition, 1998.*
Rigoll et al., "High Performance Real-Time Gesture Recognition Using Hidden Markov Models," Gesture and Sign Language in Human-Computer Interaction, vol. LNAI 1371, Frohlich, ed., pp. 69-80, 1997.*
Wilson et al., "Hidden Markov Models for Modeling and Recognizing Gesture Under Variation," Hidden Markov Models:Applications in Computer Vision., T. Caelli, ed., World Scientific, pp. 123-160, 2001.*
Guler, Sadiye Zeyno,"Split and Merge Behavior Analysis and Understanding Using Hidden Markov Models", Oct. 8, 2002, all pages.*
Sharon Oviatt. Ten Myths of Multimodal Interaction. Communications of the ACM, vol. 42, No. 11, Nov. 1999, 8 pages.
Thomas Baudel and Michel Beaudouin-Lafon. Charade: Remote Control of Objects using Free-Hand Gestures. Communications of the ACM, vol. 36. No. 7, Jul. 1993. 10 pages.
Claudette Cedras and Mubarak Shah. Motion-based Recognition: A Survey. IEEE Proceedings, image and Vision Computing, vol. 13, No. 2, pp. 129-155. Mar. 1995.
Michael Nielsen, Moritz Storring. Thomas B. Moeslund, and Erik Granum. A Procedure For Developing Intuitive And Ergonomic Gesture Interfaces For Man-Machine Interaction. Technical Report CVMT 03-01. ISSN 1601-3646. CVMT. Aalborg University. Mar. 2003. 12 pages.
Thomas B. Moeslund and Erik Granum. A Survey of Computer Vision-Based Human Motion Capture. Computer Vision and Image Understanding: CVIU, vol. 81, No. 3. pp. 231-268, 2001.
R. Sharma. M. Yeasin, N. Krahnstoever, I. Rauschert. G. Cai, I. Brewer, A. Maceachren, and K. Sengupta. Speech-Gesture Driven Multimodal Interfaces for Crisis Management. Proceedings of IEEE special issue on Multimodal Human-Computer Interface. 48 pages.
Will Fitzgerald and R. James Firby. Multimodal Event Parsing for Intelligent User Interfaces. IUI Conference, Jan. 2003. 8 pages.
Andrew Wilson, et al., GWindows: Towards Robust Perception-Based UI, Microsoft Research, 2003, pp. 1-8.
Zhengyou Zhang, Flexible Camera calibration by Viewing a Plane from Unknown Orientations, Microsoft Research, 1999, 8 pages.
Ikushi Yoda, et al., Utilization of Stereo Disparity and Optical Flow information for Human Interaction, Proceedings of the Sixth International Conference on Computer Vision, 1998, 5 pages, IEEE Computer Society, Washington D.C., USA.
Aileen Worden, et al., Making Computers Easier for Older Adults to Use: Area Cursors and Sticky Icons, CHI 97, 1997, pp. 266-271, Atlanta, Georgia, USA.
Shumin Zhai, et al., The "Silk Cursor": Investigating Transparency for 3D Target Acquisition, CHI'94, 1994, pp. 273-279.
Kanade, et al. Development of Video-Rate Stereo Machine, Proceedings of 94 ARPA Image Understanding Workshop, 1994, pp. 549-558. Last accessed Sep. 30, 2008, 4 pages.
Darrell, et al. Integrated Person Tracking Using Stereo, Color and Pattern Dectection, Proceedings of the Conference on Computer Vision and Pattern Recognition, 1998, pp. 601-609. Last accessed Jul. 8, 2005, 10 pages.
Zhang A. Flexible New Technique for Camera Calibration, IEEE Transactions on Pattern Analysis and Machine Intelligence, Nov. 2000, pp. 1330-1334, vol. 22, No. 11. Last accessed Nov. 23, 2005, 5 pages.
GWindows: Light-Weight Stereo Vision for Interaction. http://research.microsoft.com/~nuria/gwindows.htm. Last accessed Jul. 8, 2005, 2 pages.
Long, Jr., et al. Implications for a Gesture Design Tool, Proceedings of CHI'99, 1999, pp. 40-47. Last accessed Jul. 8, 2005, 8 pages.
Moyle, et al. Gesture Navigation: An Alternative 'Back' for the Future, Proceedings of CHI'02, 2002, pp. 882-823.
Oh, et al. Evaluating Look-to-talk: A Gaze-Aware interface in a Collaborative Environment, CHI'02, 2002, pp. 650-651. Last accessed Jul. 8, 2005, 3 pages.
Guiard. Asymmetric Division of Labor in Human Skilled Bimanual Action: The Kinematic Chain as a Model, Journal of Motor Behavior, 1987, pp. 486-517, vol. 19 Issue 4.
Buxton, et al. A Study of Two-Handed Input, Proceedings of CHI'86, 1986, pp. 321-326. Last accessed Jul. 8, 2005, 6 pages.
Kabbash, et al. The "Prince" Technique: Fitts' Law and Selection Using Area Cursors, Proceedings of CHI'95, 1995, pp. 273-279. http://www.billbuxton.com/prince.html. Last accessed Jul. 8, 2005, 11 pages.
Welford. Signal, Noise, Performance, and Age. Human Factors, 1981, pp. 97-109, vol. 23, Issue 1. http://www.ingentaconnect.com/content/hfes/hf/1981/00000023/00000001/art0009.
Walker, et al. Age Related Differences in Movement Control: Adjusting Submovement Structure to Optimize Performance, Journals of Gerontology, Jan. 1997, pp. p40-p52. http://psychsoc.gerontologyjournals.org/cgi/content/abstract/52/1/p40.
Ali Azarbayejani and Alex Pentland, Real-Time Self-Calibrating Stereo Person Tracking Using 3-D Shape Estimation from Blob Features, Proceedings of ICPR, Aug. 1996, pp. 627-632, Vienna, Austria.
Cristopher Mignot, Claude Valot, and Noelle Carbonell, An Experimental Study of Future 'Natural' Multimodal Human-Computer Interaction, proceedings of INTERCHI93, 1993 pp. 67-68.
Erice Horvitz and Tim Peak, A Computational Architecture for Conversation, Proceedings of the Seventh International Conference on User Modeling, 1999, pp. 201-210.
Eric Horvitz, Principles of Mixed-Initiative User Interfaces, Proceedings of CHI, 1999.
Francois Berard, The Perceptual Window-Head Motion as a New Input Steam, Proceedings of the Seventh IFIP Conference of Human-Computer interaction, 1999, pp. 238-244.
Frederik C. M. Kjeldsen, Visual Interpretation of Hand Gestures as Practical Interface Modality, Ph.D. Dissertation, 1997, Columbia University Department of Computer Science, 168 pages.
Nebojsa Jojic, Barry Brumitt, Brian Meyers, Steve Harris and Thomas Huang, Dectection and Estimation of Pointing Gestures in Dense Disparity Maps, Proceedings of IEEE International Conference on Automatic Face and Gesture Recognition, 2000, pp. 1000-10007, France.
Pattie Maes, Trevor Darrell, Bruce Blumberg, and Alex Pentland, The ALIVE System: Wireless, Full-body, Interaction with Autonomous Agents, ACM Multimedia Systems, Special Issue on Multimedia and Multisensory Virtual Worlds, 1996.
William T. Freeman and Craig D. Weissman, Television Control by Hand Gestures, International Workshop on Automatic Face and Gesture Recognition, 1995, pp. 179-183.

* cited by examiner

ARCHITECTURE FOR CONTROLLING A COMPUTER USING HAND GESTURES

TECHNICAL FIELD

The present invention relates generally to controlling a computer system, and more particularly to a system and method to implement alternative modalities for controlling computer application programs and manipulating on-screen objects through hand gestures or a combination of hand gestures and verbal commands.

BACKGROUND OF THE INVENTION

A user interface facilitates the interaction between a computer and computer user by enhancing the user's ability to utilize application programs. The traditional interface between a human user and a typical personal computer is implemented with graphical displays and is generally referred to as a graphical user interface (GUI). Input to the computer or particular application program is accomplished through the presentation of graphical information on the computer screen and through the use of a keyboard and/or mouse, trackball or other similar implements. Many systems employed for use in public areas utilize touch screen implementations whereby the user touches a designated area of a screen to effect the desired input. Airport electronic ticket check-in kiosks and rental car direction systems are examples of such systems. There are, however, many applications where the traditional user interface is less practical or efficient.

The traditional computer interface is not ideal for a number of applications. Providing stand-up presentations or other type of visual presentations to large audiences, is but one example. In this example, a presenter generally stands in front of the audience and provides a verbal dialog in conjunction with the visual presentation that is projected on a large display or screen. Manipulation of the presentation by the presenter is generally controlled through use of awkward remote controls, which frequently suffer from inconsistent and less precise operation, or require the cooperation of another individual. Traditional user interfaces require the user either to provide input via the keyboard or to exhibit a degree of skill and precision more difficult to implement with a remote control than a traditional mouse and keyboard. Other examples include control of video, audio, and display components of a media room. Switching between sources, advancing fast fast-forward, rewinding, changing chapters, changing volume, etc., can be very cumbersome in a professional studio as well as in the home. Similarly, traditional interfaces are not well suited for smaller, specialized electronic gadgets.

Additionally, people with motion impairment conditions find it very challenging to cope with traditional user interfaces and computer access systems. Such conditions include Cerebral Palsy, Muscular Dystrophy, Friedrich's Ataxia, and spinal injuries or disorders. These conditions and disorders are often accompanied by tremors, spasms, loss of coordination, restricted range of movement, reduced muscle strength, and other motion impairing symptoms.

Similar symptoms exist in the growing elderly segment of the population. As people age, their motor skills decline and impact the ability to perform many tasks. It is known that as people age, their cognitive, perceptual and motor skills decline, with negative effects in their ability to perform many tasks. The requirement to position a cursor, particularly with smaller graphical presentations, can often be a significant barrier for elderly or afflicted computer users. Computers can play an increasingly important role in helping older adults function well in society.

Graphical interfaces contribute to the ease of use of computers. WIMP (Window, Icon, Menu, Pointing device (or Pull-down menu)) interfaces allow fairly non-trivial operations to be performed with a few mouse motions and clicks. However, at the same time, this shift in the user interaction from a primarily text-oriented experience to a point-and-click experience has erected new barriers between people with disabilities and the computer. For example, for older adults, there is evidence that using the mouse can be quite challenging. There is extensive literature demonstrating that the ability to make small movements decreases with age. This decreased ability can have a major effect on the ability of older adults to use a pointing device on a computer. It has been shown that even experienced older computer users move a cursor much more slowly and less accurately than their younger counterparts. In addition, older adults seem to have increased difficulty (as compared to younger users) when targets become smaller. For older computer users, positioning a cursor can be a severe limitation.

One solution to the problem of decreased ability to position the cursor with a mouse is to simply increase the size of the targets in computer displays, which can often be counter-productive since less information is being displayed, requiring more navigation. Another approach is to constrain the movement of the mouse to follow on-screen objects, as with sticky icons or solid borders that do not allow cursors to overshoot the target. There is evidence that performance with area cursors (possibly translucent) is better than performance with regular cursors for some target acquisition tasks.

One method to facilitate computer access for users with motion impairment conditions and for applications, in which the traditional user interfaces are cumbersome, is through use of perceptual user interfaces. Perceptual user interfaces utilize alternate sensing modalities, such as the capability of sensing physical gestures of the user, to replace or complement traditional input devices such as the mouse and keyboard. Perceptual user interfaces promise modes of fluid computer-human interaction that complement and/or replace the mouse and keyboard, particularly in non-desktop applications such as control for a media room.

One study indicates that adding a simple gesture-based navigation facility to web browsers can significantly reduce the time taken to carry out one of the most common actions in computer use, i.e., using the "back" button (or function) to return to previously visited pages. Subjective ratings by users in experiments showed a strong preference for a "flick" system, where the users would flick the mouse left or right to go back or forward in the web browser.

In the simplest view, gestures play a symbolic communication role similar to speech, suggesting that for simple tasks gesture may enhance or replace speech recognition. Small gestures near the keyboard or mouse do not induce fatigue as quickly as sustained whole arm postures. Previous studies indicate that users find gesture-based systems highly desirable, but that users are also dissatisfied with the recognition accuracy of gesture recognizers. Furthermore, experimental results indicate that a user's difficulty with gestures is in part due to a lack of understanding of how gesture recognition works. The studies highlight the ability of users to learn and remember gestures as an important design consideration.

Even when a mouse and keyboard are available, users may find it attractive to manipulate often-used applications while away from the keyboard, in what can be called a "casual interface" or "lean-back" posture. Browsing e-mail over morning coffee might be accomplished by mapping simple gestures to "next message" and "delete message".

Gestures may compensate for the limitations of the mouse when the display is several times larger than a typical display. In such a scenario, gestures can provide mechanisms to restore the ability to quickly reach any part of the display, where once a mouse was adequate with a small display. Similarly, in a multiple display scenario it is desirable to have a fast comfortable way to indicate a particular display. For example, the foreground object may be "bumped" to another display by gesturing in the direction of the target display.

However, examples of perceptual user interfaces to date are dependent on significant limiting assumptions. One type of perceptual user interface utilizes color models that make certain assumptions about the color of an object. Proper operation of the system is dependent on proper lighting conditions and can be negatively impacted when the system is moved from one location to another as a result of changes in lighting conditions, or simply when the lighting conditions change in the room. Factors that impact performance include sun light versus artificial light, florescent light versus incandescent light, direct illumination versus indirect illumination, and the like. Additionally, most attempts to develop perceptual user interfaces require the user to wear specialized devices such as gloves, headsets, or close-talk microphones. The use of such devices is generally found to be distracting and intrusive for the user.

Thus perceptual user interfaces have been slow to emerge. The reasons include heavy computational burdens, unreasonable calibration demands, required use of intrusive and distracting devices, and a general lack of robustness outside of specific laboratory conditions. For these and similar reasons, there has been little advancement in systems and methods for exploiting perceptual user interfaces. However, as the trend towards smaller, specialized electronic gadgets continues to grow, so does the need for alternate methods for interaction between the user and the electronic device. Many of these specialized devices are too small and the applications unsophisticated to utilize the traditional input keyboard and mouse devices. Examples of such devices include TabletPCs, Media center PCs, kiosks, hand held computers, home appliances, video games, and wall sized displays, along with many others. In these, and other applications, the perceptual user interface provides a significant advancement in computer control over traditional computer interaction modalities.

In light of these findings, what is needed is to standardize a small set of easily learned gestures, the semantics of which are determined by application context. A small set of very simple gestures may offer significant bits of functionality where they are needed most. For example, dismissing a notification window may be accomplished by a quick gesture to the one side or the other, as in shooing a fly. Another example is gestures for "next" and "back" functionality found in web browsers, presentation programs (e.g., PowerPoint™) and other applications. Note that in many cases the surface forms of these various gestures may remain the same throughout these examples, while the semantics of the gestures depends on the application at hand. Providing a small set of standard gestures eases problems users have in recalling how gestures are performed, and also allows for simpler and more robust signal processing and recognition processes.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology to implement a perceptual user interface comprising alternative modalities for controlling computer application programs and manipulating on-screen objects through hand gestures or a combination of hand gestures and verbal commands. A perceptual user interface system is provided that detects and tracks hand and/or object movements, and provides for the control of application programs and manipulation of on-screen objects in response to hand or object movements performed by the user. The system operates in real time, is robust, responsive, and introduces a reduced computational load due to "lightweight" sparse stereo image processing by not imaging every pixel, but only a reduced representation of image pixels. That is, the depth at every pixel in the image is not computed, which is the typical approach in conventional correlation-based stereo systems. The present invention utilizes the depth information at specific locations in the image that correspond to object hypotheses.

The system provides a relatively inexpensive capability for the recognition of hand gestures.

Mice are particularly suited to fine cursor control, and most users have much experience with them. The disclosed invention can provide a secondary, coarse control that may complement mice in some applications. For example, in a map application, the user might cause the viewpoint to change with a gesture, while using the mouse to select and manipulate particular objects in the view. The present invention may also provide a natural "push-to-talk" or "stop-listening" signal to speech recognition processes. Users were shown to prefer using a perceptual user interface for push-to-talk. The invention combines area cursors with gesture-based manipulation of on-screen objects, and may be configured to be driven by gross or fine movements, and may be helpful to people with limited manual dexterity.

A multiple hypothesis tracking framework allows for the detection and tracking of multiple objects. Thus tracking of both hands may be considered for a two-handed interface. Studies show that people naturally assign different tasks to each hand, and that the non-dominant hand can support the task of the dominant hand. Two-handed interfaces are often used to specify spatial relationships that are otherwise more difficult to describe in speech. For example, it is natural to describe the relative sizes of objects by holding up two hands, or to specify how an object (dominant hand) is to be moved with respect to its environment (non-dominant hand). Thus there is provided a system that facilitates the processing of computer-human interaction in response to multiple input modalities. The system processes commands in response to hand gestures or a combination of hand gestures and verbal commands, or in addition to traditional computer-human interaction modalities such as a keyboard and mouse. The user interacts with the computer and controls the application through a series of hand gestures, or a combination of hand gestures and verbal commands, but is also free to operate the system with traditional interaction devices when more appropriate. The system and method provide for certain actions to be performed in response to particular verbal commands. For example, a verbal command "Close" may be used to close a selected window and a verbal command "Raise" may be used to bring the window to the forefront of the display.

In accordance with another aspect thereof, the present invention facilitates adapting the system to the particular preferences of an individual user. The system and method allow the user to tailor the system to recognize specific hand gestures and verbal commands and to associate these hand gestures and verbal commands with particular actions to be taken. This capability allows different users, which may prefer to make different motions for a given command, the ability to tailor the system in a way most efficient for their personal use. Similarly, different users can choose to use different verbal commands to perform the same function. For example, one user may choose to say "Release" to stop moving a window while another may wish to say "Quit".

In accordance with another aspect of the present invention, dwell time is used as an alternative modality to complement gestures or verbal commands. Dwell time is the length of time an input device pointer remains in a particular position (or location of the GUI), and is controlled by the user holding one hand stationary while the system is tracking that hand. In response to the hand gesture, or combination of hand gestures, the pointer may be caused to be moved by the system to a location of the GUI. The disclosed invention provides for a modality such that if the pointer dwell time equals or exceeds predetermined dwell criteria, the system reacts accordingly. For example, where the dwell time exceeds a first criteria, the GUI window is selected. Dwelling of the pointer for a longer period of time in a portion of a window invokes a corresponding command to bring the window to the foreground of the GUI display, while dwelling still longer invokes a command to cause the window to be grabbed and moved.

In accordance with yet another aspect of the present invention, video cameras are used to view a volume of area. This volume of area is generally in front of the video display (on which the video cameras may be located) and is designated as an engagement volume wherein gesture commands may be performed by the user and recognized by the system. Objects in motion are detected by comparing corresponding patches (subsets of video of the entire video image) of video from successive video images. By analyzing and comparing the corresponding video patches from successive images, objects in motion are detected and tracked.

In accordance with still another aspect of the invention, two video cameras are mounted substantially parallel to each other to generate video images that are used to determine the depth (distance from the camera, display, or other point of reference) of a moving object using a lightweight sparse stereo technique. The lightweight sparse stereo technique reduces the computational requirements of the system and the depth component is used as an element in determining whether that particular object is the nearest object within the engagement volume.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The present invention relates to a system and methodology for implementing a perceptual user interface comprising alternative modalities for controlling computer programs and manipulating on-screen objects through hand gestures or a combination of hand gestures and/or verbal commands. A perceptual user interface system is provided that tracks hand movements and provides for the control of computer programs and manipulation of on-screen objects in response to hand gestures performed by the user. Similarly the system provides for the control of computer programs and manipulation of on-screen objects in response to verbal commands spoken by the user. Further, the gestures and/or verbal commands may be tailored by a particular user to suit that user's personal preferences. The system operates in real time and is robust, light in weight and responsive. The system provides a relatively inexpensive capability for the recognition of hand gestures and verbal commands.

Figure 1:
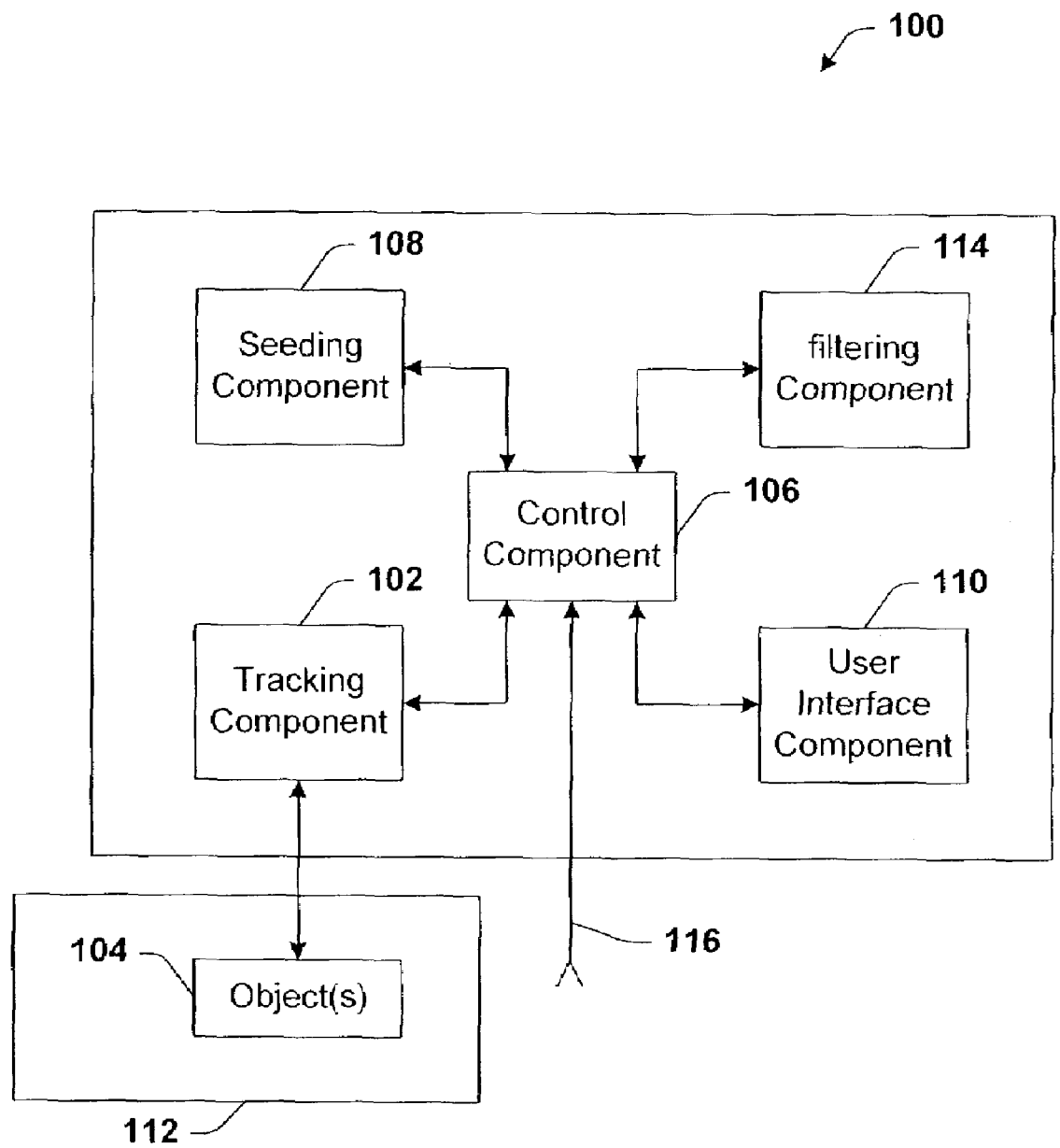
FIG. 1 illustrates a system block diagram of components of the present invention for controlling a computer and/or other hardware/software peripherals interfaced thereto.

Referring now to FIG. 1, there is illustrated a system block diagram of components of the present invention for controlling a computer and/or other hardware/software peripherals interfaced thereto. The system 100 includes a tracking component 102 for detecting and tracking one or more objects 104 through image capture utilizing cameras (not shown) or other suitable conventional image-capture devices. The cameras operate to capture images of the object(s) 104 in a scene within the image capture capabilities of the cameras so that the images may be further processed to not only detect the presence of the object(s) 104, but also to detect and track object(s) movements. It is appreciated that in more robust implementations, object characteristics such as object features and object orientation may also be detected, tracked, and processed. The object(s) 104 of the present invention include basic hand movements created by one or more hands of a system user and/or other person selected for use with the disclosed system. However, in more robust system implementations, such objects may include many different types of objects with object characteristics, including hand gestures each of which have gesture characteristics including but not limited to, hand movement, finger count, finger orientation, hand rotation, hand orientation, and hand pose (e.g., opened, closed, and partially closed).

The tracking component 102 interfaces to a control component 106 of the system 100 that controls all onboard component processes. The control component 106 interfaces to a seeding component 108 that seeds object hypotheses to the tracking component based upon the object characteristics.

The object(s) 104 are detected and tracked in the scene such that object characteristic data is processed according to predetermined criteria to associate the object characteristic data with commands for interacting with a user interface component 110. The user interface component 110 interfaces to the control component 106 to receive control instructions that affect presentation of text, graphics, and other output (e.g., audio) provided to the user via the interface component 110. The control instructions are communicated to the user interface component 110 in response to the object characteristic data processed from detection and tracking of the object(s) within a predefined engagement volume space 112 of the scene.

A filtering component 114 interfaces to the control component 106 to receive filtering criteria in accordance with user filter configuration data, and to process the filtering criteria such that tracked object(s) of respective object hypotheses are selectively removed from the object hypotheses and/or at least one hypothesis from a set of hypotheses within the volume space 112 and the scene. Objects are detected and tracked either within the volume space 112 or outside the volume space 112. Those objects outside of the volume space 112 are detected, tracked, and ignored, until entering the volume space 112.

The system 100 also receives user input via input port(s) 116 such as input from pointing devices, keyboards, interactive input mechanisms such as touch screens, and audio input devices.

The subject invention (e.g., in connection with object detection, tracking, and filtering) can employ various artificial intelligence based schemes for carrying out various aspects of the subject invention. For example, a process for determining which object is to be selected for tracking can be facilitated via an automatic classification system and process. Such classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information) so that the classifier(s) is used to automatically determine according to a predetermined criteria which object(s) should be selected for tracking and which objects that were being tracked are now removed from tracking. The criteria can include, but is not limited to, object characteristics such as object size, object speed, direction of movement, distance from one or both cameras, object orientation, object features, and object rotation. For example, with respect to SVM's which are well understood—it is to be appreciated that other classifier models may also be utilized such as Naive Bayes, Bayes Net, decision tree and other learning models—SVM's are configured via a learning or training phase within a classifier constructor and feature selection module. A classifier is a function that maps an input attribute vector, $x=(x1, x2, x3, x4, \ldots, xn)$, to a confidence that the input belongs to a class—that is, $f(x)=$confidence (class). In the case of text-based data collection synchronization classification, for example, attributes are words or phrases or other data-specific attributes derived from the words (e.g., parts of speech, presence of key terms), and the classes are categories or areas of interest (e.g., levels of priorities).

Figure 2:
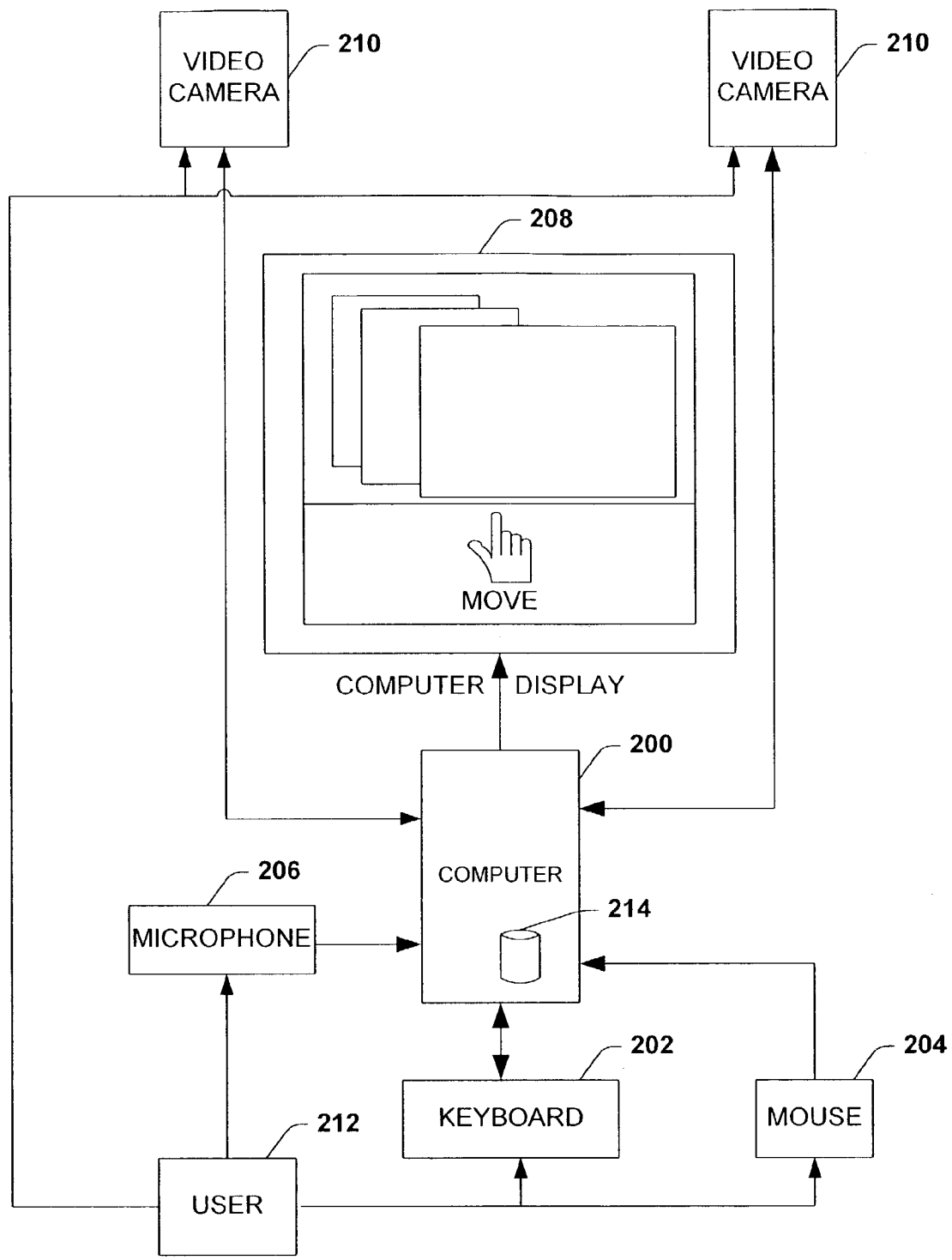
FIG. 2 illustrates a schematic block diagram of a perceptual user interface system, in accordance with an aspect of the present invention.

Referring now to FIG. 2, there is illustrated a schematic block diagram of a perceptual user interface system, in accordance with an aspect of the present invention. The system comprises a computer 200 with a traditional keyboard 202, input pointing device (e.g., a mouse) 204, microphone 206, and display 208. The system further comprises at least one video camera 210, at least one user 212, and software 214. The exemplary system of FIG. 2 is comprised of two video cameras 210 mounted substantially parallel to each other (that is, the rasters are parallel) and the user 212. The first camera is used to detect and track the object, and the second camera is used for determining the depth (or distance) of the object from the camera(s). The computer 200 is operably connected to the keyboard 202, mouse 204 and display 208. Video cameras 210 and microphone 206 are also operably connected to computer 200. The video cameras 210 "look" towards the user 212 and may point downward to capture objects within the volume defined above the keyboard and in front of the user. User 212 is typically an individual that is capable of providing hand gestures, holding objects in a hand, verbal commands, and mouse and/or keyboard input. The hand gestures and/or object(s) appear in video images created by the video cameras 210 and are interpreted by the software 214 as commands to be executed by computer 200. Similarly, microphone 206 receives verbal commands provided by user 212, which are in turn, interpreted by software 214 and executed by computer 200. User 212 can control and operate various application programs on the computer 200 by providing a series of hand gestures or a combination of hand gestures, verbal commands, and mouse/keyboard input.

Figure 3:
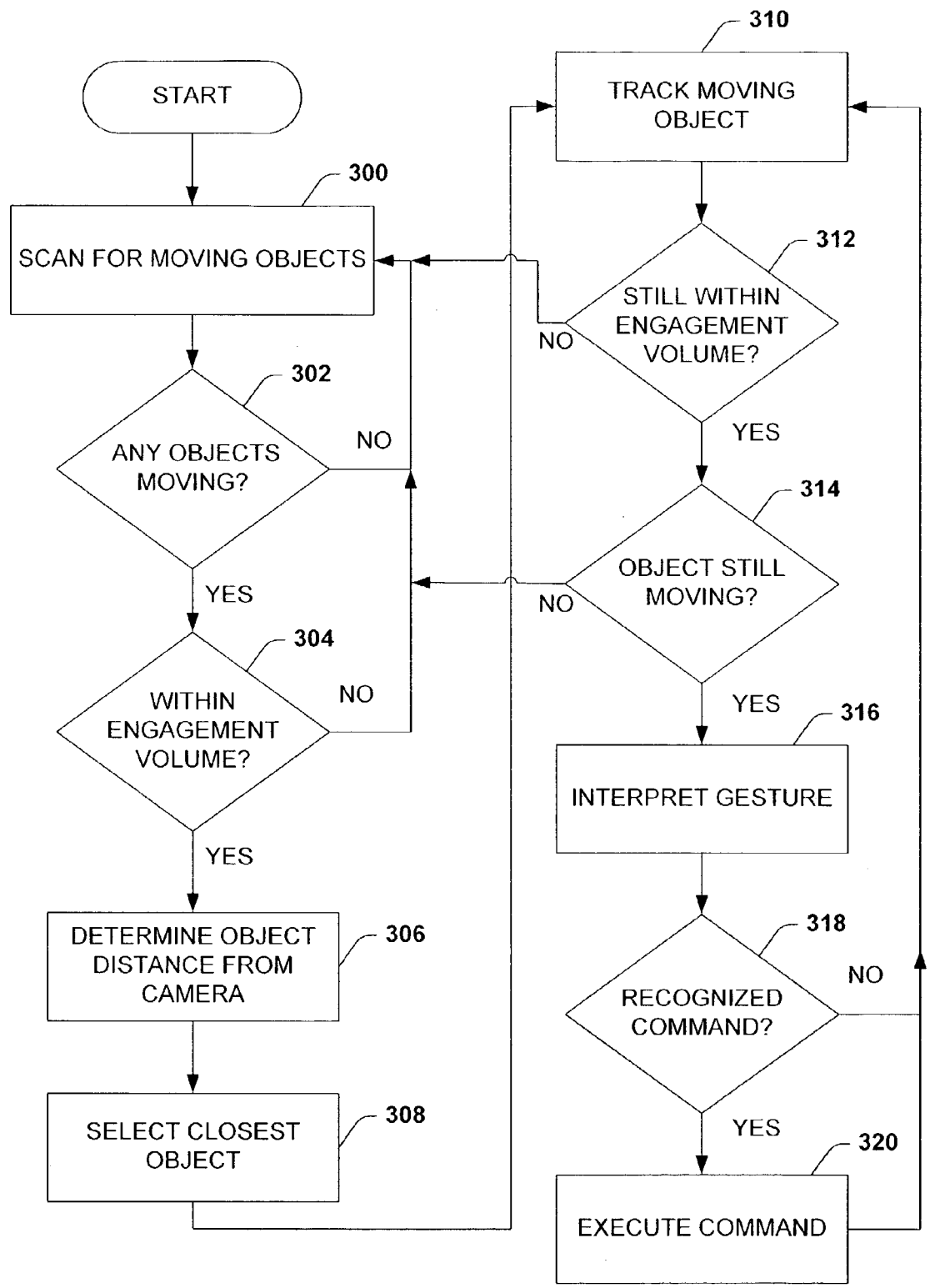
FIG. 3 illustrates a flow diagram of a methodology for implementing a perceptual user interface system, in accordance with an aspect of the present invention.
Figure 4:
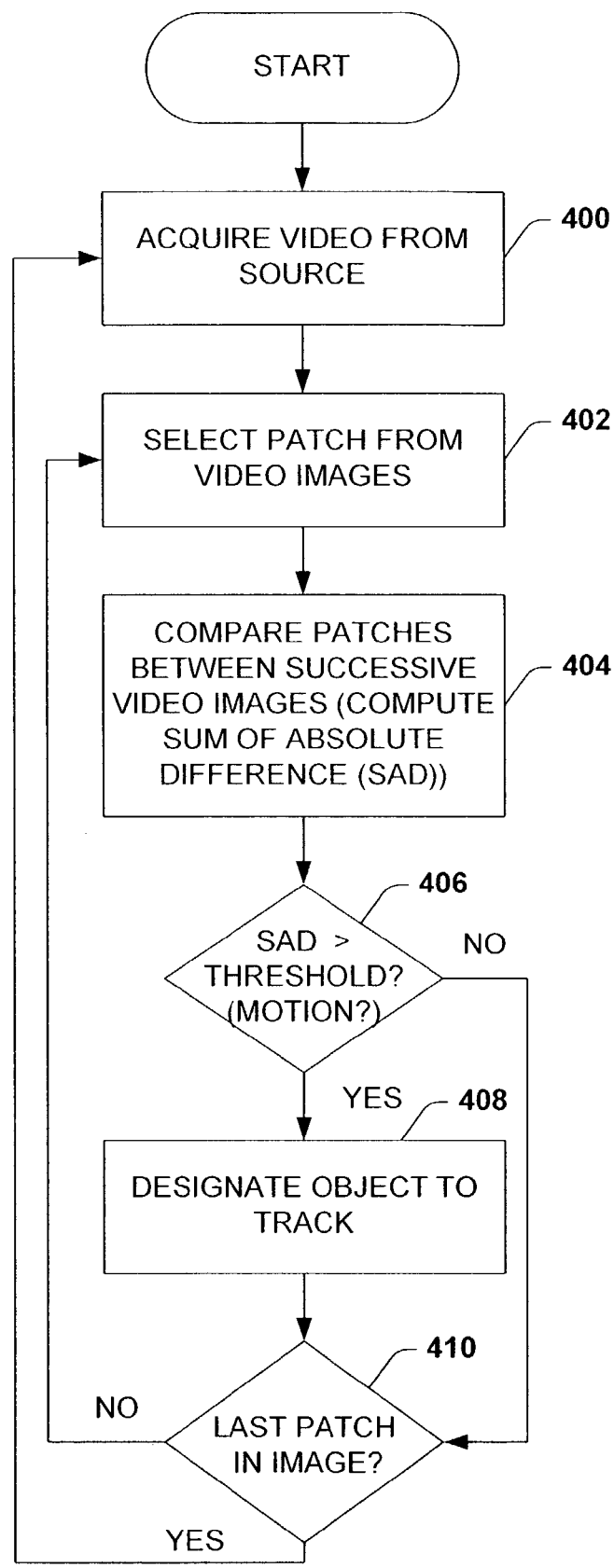
FIG. 4 illustrates a flow diagram of a methodology for determining the presence of moving objects within images, in accordance with an aspect of the present invention.
Figure 5:
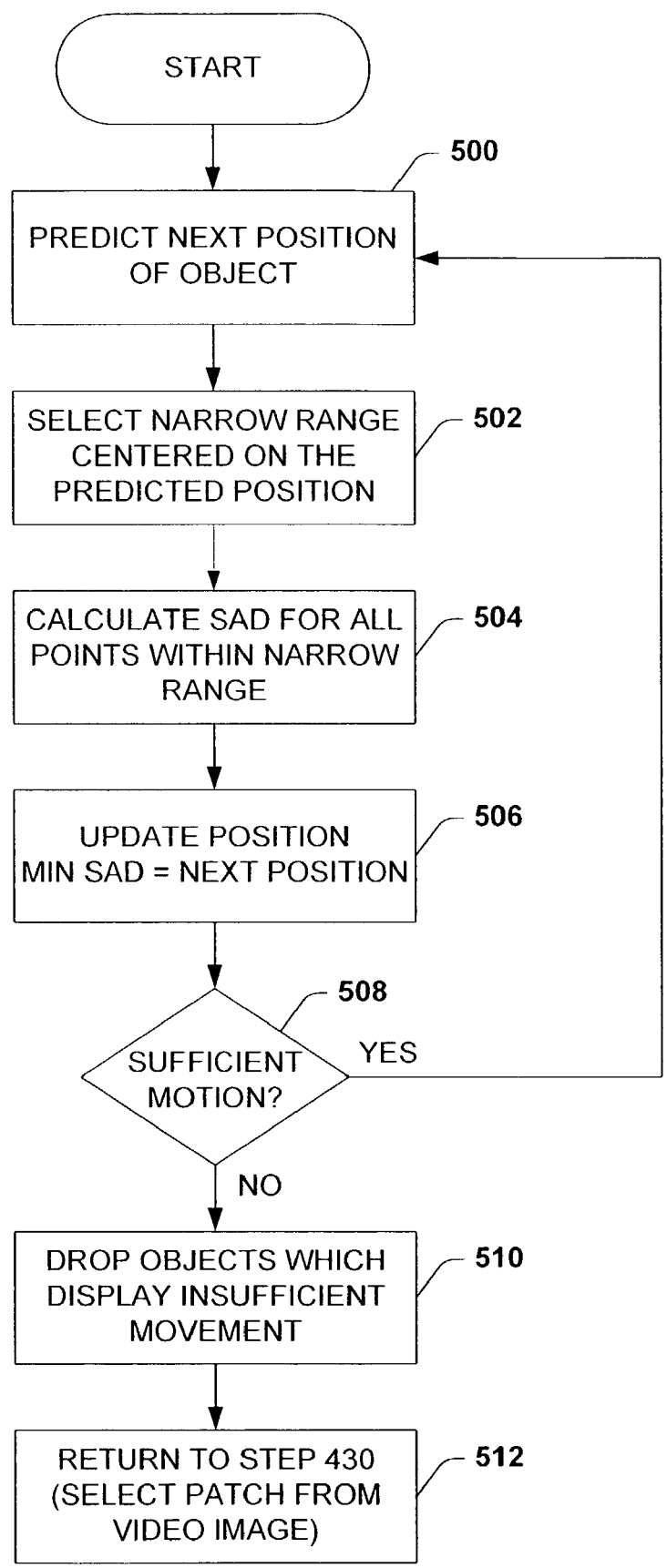
FIG. 5 illustrates a flow diagram of a methodology for tracking a moving object within an image, in accordance with an aspect of the present invention.

In view of the foregoing structural and functional features described above, methodologies in accordance with various aspects of the present invention will be better appreciated with reference to FIGS. 3-5. While, for purposes of simplicity of explanation, the methodologies of FIGS. 3-5 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

Accordingly, FIG. 3 is a flow diagram that illustrates a high level methodology for detecting the user's hand, tracking movement of the hand and interpreting commands in accordance with an aspect of the invention. While, for purposes of simplicity of explanation, the methodologies shown here and below are described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

The methodology begins at 300 where video images are scanned to determine whether any moving objects exist within the field of view (or scene) of the cameras. The system is capable of running one or more object hypothesis models to detect and track objects, whether moving or not moving. In one embodiment, the system runs up to and including six object hypotheses. If more than one object is detected as a result of the multiple hypotheses, the system drops one of the objects if the distance from any other object falls below a threshold distance, for example, five inches. It is assumed that the two hypotheses are redundantly tracking the same object, and one of the hypotheses is removed from consideration. At 302, if NO, no moving object(s) have been detected, and flow returns to 300 where the system continues to scan the current image for moving objects. Alternatively, if YES, object movement has been detected, and flow continues from 302 to 304 where it is determined whether or not one or more moving objects are within the engagement volume. It is appreciated that the depth of the object may be determined before determination of whether the object is within the engagement volume.

The engagement volume is defined as a volume of space in front of the video cameras and above the keyboard wherein the user is required to introduce the hand gestures (or object (s)) in order to utilize the system. A purpose of the engagement volume is to provide a means for ignoring all objects and/or gestures in motion except for those intended by the user to effect control of the computer. If a moving object is detected at 302, but is determined not to be within the engagement volume, then the system dismisses the moving object as not being a desired object to track for providing commands. Flow then loops back to the input of 300 to scan for more objects. However, if the moving object is determined to be within the engagement volume, then the methodology proceeds to 306. However, new objects are seeded only when it is determined that the new object is a sufficient distance away from an existing object that is being tracked (in 3-D). At 306, the system determines the distance of each moving object from the video cameras. At 308, if more than one moving object is detected within the engagement volume, then the object closest to the video camera(s) is selected as the desired command object. If by the given application context the user is predisposed to use hand gestures towards the display, the nearest object hypotheses will apply to the hands. In other scenarios, more elaborate criteria for object selection may be used. For example, an application may select a particular object based upon its quality of movement over time. Additionally, a two-handed interaction application may select an object to the left of the dominant hand (for right handed users) as the non-dominant hand. The command object is the object that has been selected for tracking, the movements of which will be analyzed and interpreted for gesture commands. The command object is generally the user's dominant hand. Once the command object is selected, its movement is tracked, as indicated at 310.

At 312, the system determines whether the command object is still within the engagement volume. If NO, the object has moved outside the engagement volume, and the system dismisses the object hypothesis and returns to 300 where the current image is processed for moving objects. If NO, the object is still within the engagement volume, and flow proceeds to 314. At 314, the system determines whether the object is still moving. If no movement is detected, flow is along the NO path returning to 300 to process the current camera images for moving objects. If however, movement is detected, then flow proceeds from 314 to 316. At 316, the system analyzes the movements of the command object to interpret the gestures for specific commands. At 318, it is determined whether the interpreted gesture is a recognized command. If NO, the movement is not interpreted as a recognized command, and flow returns to 310 to continue tracking the object. However, if the object movement is interpreted as a recognized command, flow is to 320 where the system executes the corresponding command. After execution thereof, flow returns to 310 to continue tracking the object. This process may continually execute to detect and interpret gestures.

In accordance with an aspect of the invention, algorithms used to interpret gestures are kept to simple algorithms and are performed on sparse ("lightweight") images to limit the computational overhead required to properly interpret and execute desired commands in real time. In accordance with another aspect of the invention, the system is able to exploit the presence of motion and depth to minimize computational requirements involved in determining objects that provide gesture commands.

Referring now to FIG. 4, there is illustrated a flow diagram of a methodology for determining the presence of moving objects within video images created by one or more video sources, in accordance with an aspect of the present invention. The methodology exploits the notion that attention is often drawn to objects that move. At 400, video data is acquired from one or more video sources. Successive video images are selected from the same video source, and motion is detected by comparing a patch of a current video image, centered on a given location, to a patch from the previous video image centered on the same location. At 402, a video patch centered about a point located at $(u_1,v_1)$, and $(u_2,v_2)$ is selected from successive video images $I_1$, and $I_2$, respectively. A simple comparison function is utilized wherein the sum of the absolute differences (SAD) over square patches in two images is obtained. For a patch from image $I_1$ centered on pixel location $(u_1,v_1)$ and a patch in image $I_2$ centered on $(u_2,v_2)$, the image comparison function is defined as $SAD(I_1, u_1,v_1,I_2,u_2,v_2)$ as:

$$\sum_{-\frac{D}{2} \leq i,j \leq \frac{D}{2}} |I_1(u_1+i, v_1+j) - I_2(u_2+i, v_2+j)|$$

where l(u,v) refers to the pixel at (u,v), D is the patch width, and the absolute difference between two pixels is the sum of the absolute differences taken over all available color channels. Regions in the image that have movement can be found by determining points (u,v) such that function SAD($I_{t-1}, u_{t-1}, v_{t-1}, I_t, u_t, v_t$)>t, where the subscript refers to the image at time t, and t is a threshold level for motion. At 404, a comparison is made between patches from image $I_1$ and $I_2$ using the sum of the absolute difference algorithm. At 406, the result of the sum of the absolute difference algorithm is compared to a threshold value to determine whether a threshold level of motion exists within the image patch. If SAD=t, no sufficient motion exists, and flow proceeds to 410. If at 406, SAD>t, then sufficient motion exists within the patch, and flow is to 408 where the object is designated for continued tracking. At 410, the system determines whether the current image patch is the last patch to be examined within the current image. If NO, the methodology returns to 402 where a new patch is selected. If YES, then the system returns to 400 to acquire a new video image from the video source.

To reduce the computational load, the SAD algorithm is computed on a sparse regular grid within the image. In one embodiment, the sparse regular grid is based on sixteen pixel centers. When the motion detection methodology determines that an object has sufficient motion, then the system tracks the motion of the object. Again, in order to limit (or reduce) the computational load, a position prediction algorithm is used to predict the next position of the moving object. In one embodiment, the prediction algorithm is a Kalman filter. However, it is to be appreciated that any position prediction algorithm can be used.

Note that the image operations may use the same SAD function on image patches, which allows for easy SIMD (Single-Instruction Stream Multiple-Data Stream, which architectures are essential in the parallel world of computers) optimization of the algorithm's implementation, which in turn allows it to run with sufficiently many trackers while still leaving CPU time to the user.

The process of seeding process hypotheses based upon motion may place more than one hypothesis on a given moving object. One advantage of this multiple hypothesis approach is that a simple, fast, and imperfect tracking algorithm may be used. Thus if one tracker fails, another may be following the object of interest. Once a given tracker has been seeded, the algorithm updates the position of the object being followed using the same function over successive frames.

Referring now to FIG. 5, there is illustrated a flow diagram of a methodology for tracking a moving object within an image, in accordance with an aspect of the present invention. The methodology begins at 500 where, after the motion detection methodology has identified the location of a moving object to be tracked, the next position of the object is predicted. Once identified, the methodology utilizes a prediction algorithm to predict the position of the object in successive frames. The prediction algorithm limits the computational burden on the system. In the successive frames, the moving object should be at the predicted location, or within a narrow range centered on the predicted location. At 502, the methodology selects a small pixel window (e.g., ten pixels) centered on the predicted location. Within this small window, an algorithm executes to determine the actual location of the moving object. At 504, the new position is determined by examining the sum of the absolute difference algorithm over successive video frames acquired at time t and time t−1. The actual location is determined by finding the location ($u_t, v_t$) that minimizes:

$$SAD(I_{t-1}, u_{t-1}, v_{t-1}, I_t, u_t, v_t),$$

where $I_t$ refers to the image at time t, $I_{t-1}$ refers to the image at time t−1, and where ($u_t, v_t$) refers to the location at time t. Once determined, the actual position is updated, at 506. At 508, motion characteristics are evaluated to determine whether the motion is still greater that the threshold level required. What is evaluated is not only the SAD image-based computation, but also movement of the object over time. The movement parameter is the average movement over a window of time. Thus if the user pauses the object or hand for a short duration of time, it may not be dropped from consideration. However, if the duration of time for the pause is still longer such that it exceeds a predetermined average time parameter, the object will be dropped. If YES, the motion is sufficient, and flow returns to 500 where a new prediction for the next position is determined. If NO, the object motion is insufficient, and the given object is dropped from being tracked, as indicated by flow to 510. At 512, flow is to 430 of FIG. 4 to select a new patch in the image from which to analyze motion.

When determining the depth information of an object (i.e., the distance from the object to the display or any other chosen reference point), a lightweight sparse stereo approach is utilized in accordance with an aspect of the invention. The sparse stereo approach is a region-based approach utilized to find the disparity at only locations in the image corresponding to the object hypothesis. Note that in the stereo matching process, it is assumed that both cameras are parallel (in rasters). Object hypotheses are supported by frame-to-frame tracking through time in one view and stereo matching across both views. A second calibration issue is the distance between the two cameras (i.e., the baseline), which must be considered to recover depth in real world coordinates. In practice, both calibration issues maybe dealt with automatically by fixing the cameras on a prefabricated mounting bracket or semi-automatically by the user presenting objects at a known depth in a calibration routine that requires a short period of time to complete. The accuracy of the transform to world coordinates is improved by accounting for lens distortion effects with a static, pre-computed calibration procedure for a given camera.

Binocular disparity is the primary means for recovering depth information from two or more images taken from different viewpoints. Given the two-dimensional position of an object in two views, it is possible to compute the depth of the object. Given that the two cameras are mounted parallel to each other in the same horizontal plane, and given that the two cameras have a focal length f, the three-dimensional position (x,y,z) of an object is computed from the positions of the object in both images ($u_l, v_l$) and ($u_r, v_r$) by the following perspective projection equations:

$$u = u_r = fx/z;$$

$$v = v_r = fy/z;$$

$$d = u_r - u_l = fb/z;$$

where the disparity, d, is the shift in location of the object in one view with respect to the other, and is related to the baseline b, the distance between the two cameras.

The vision algorithm performs 3-dimensional (3-D) tracking and 3-D depth computations. In this process, each object hypothesis is supported only by consistency of the object movement in 3-D. Unlike many conventional computer vision algorithms, the present invention does not rely on fragile appearance models such as skin color models or hand image templates, which are likely invalidated when environmental conditions change or the system is confronted with a different user.

Figure 6:
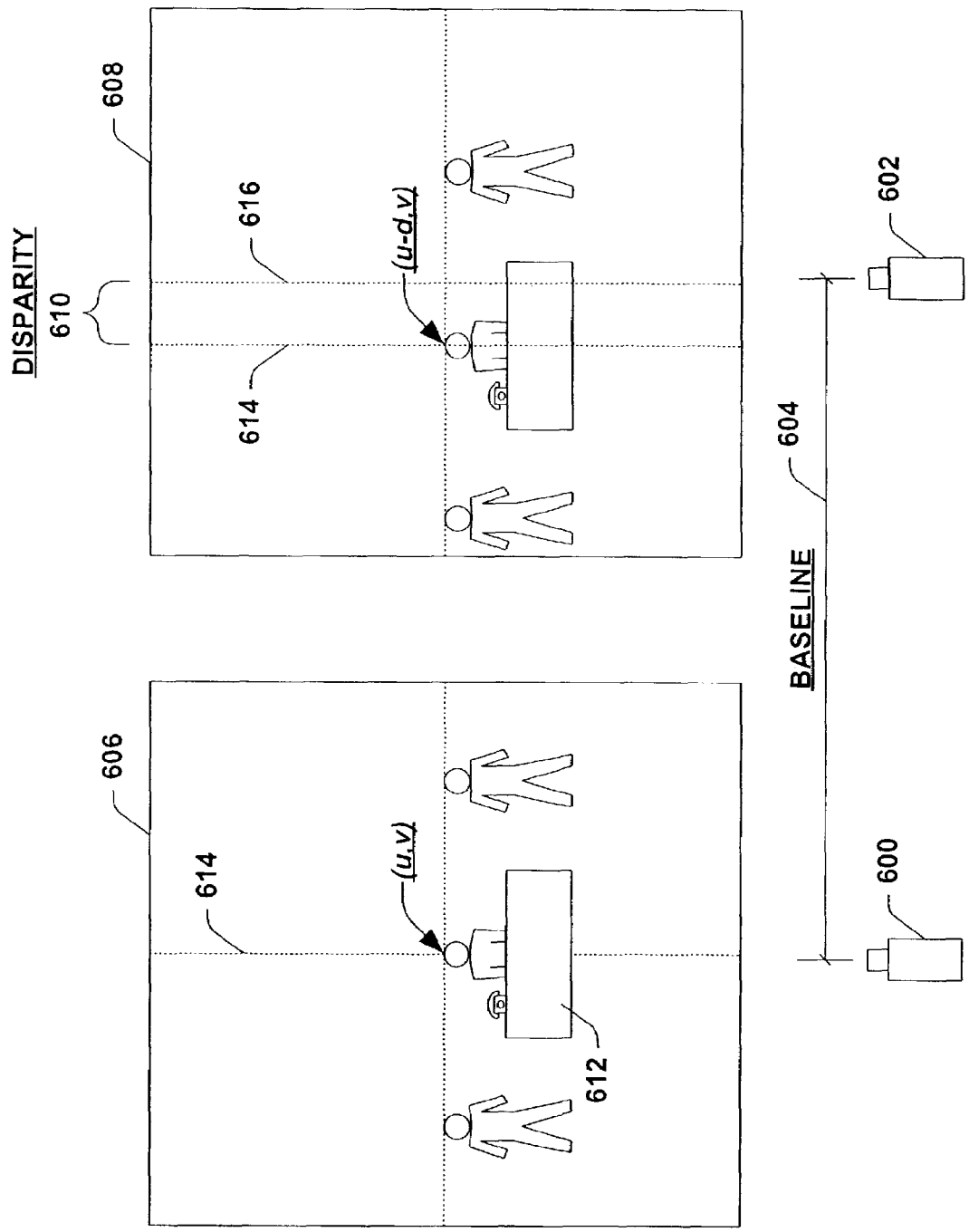
FIG. 6 illustrates a disparity between two video images captured by two video cameras mounted substantially parallel to each other for the purpose of determining the depth of objects, in accordance with an aspect of the present invention.

Referring now to FIG. 6, there is illustrated a disparity between two video images captured by two video cameras mounted substantially parallel to each other for the purpose of determining the depth of objects, in accordance with an aspect of the present invention. In FIG. 6, a first camera 600 and a second camera 602 (similar to cameras 210) are mounted substantially parallel to each other in the same horizontal plane and laterally aligned. The two cameras (600 and 602) are separated by a distance 604 defined between the longitudinal focal axis of each camera lens, also known as the baseline, b. A first video image 606 is the video image from the first camera 600 and a second video image 608 is the video image from the second camera 602. The disparity d (also item number 610), or shift in the two video images (606 and 608), can be seen by looking to an object 612 in the center of the first image 606, and comparing the location of that object 612 in the first image 606 to the location of that same object 612 in the second image 608. The disparity 610 is illustrated as the difference between a first vertical centerline 614 of the first image 606 that intersects the center of the object 612, and a second vertical centerline 616 of the second image 608. In the first image 606, the object 612 is centered about the vertical centerline 614 with the top of the object 612 located at point (u,v). In the second image 608, the same point (u,v) of the object 612 is located at point (u–d v) in the second image 608, where d is the disparity 610, or shift in the object from the first image 606 with respect to the second image 610. Given disparity d, a depth z can be determined. As will be discussed, in accordance with one aspect of the invention, the depth component z is used in part to determine if an object is within the engagement volume, where the engagement volume is the volume within which objects will be selected by the system.

In accordance with another aspect of the present invention, a sparse stereo approach is utilized in order to limit computational requirements. The sparse stereo approach is that which determines disparity d only at the locations in the image that corresponds to a moving object. For a given point (u,v) in the image, the value of disparity d is found such that the sum of the absolute differences over a patch in the first image 606 (i.e., a left image $I_l$) centered on (u,v) and a corresponding patch in the second image 608 (i.e., a right image $I_R$) centered on (u–d,v) is minimized, i.e., the dispatch value d that minimizes $SAD(I_l, u-d, v, I_r, u, v)$. If an estimate of depth z is available from a previous time, then in order to limit computational requirements, the search for the minimal disparity d is limited to a range of depth z around the last known depth.

In accordance with another aspect of the invention, the search range may be further narrowed by use of an algorithm to predict the objects new location. In one embodiment, the prediction is accomplished by utilization of a Kalman filter.

The depth z can also be computed using traditional triangulation techniques. The sparse stereo technique is used when the system operation involves detecting moving objects within a narrow range in front of the display, e.g., within twenty inches. In such cases, the two video cameras are mounted in parallel and separated by a distance equal to the approximate width of the display. However, when the system is implemented in a larger configuration, the distance between the two video cameras may be much greater. In such cases, traditional triangulation algorithms are used to determine the depth.

The foregoing discussion has focused on some details of the methodologies associated with locating and tracking an object to effect execution of corresponding and specified commands. An overview follows as to how these capabilities are implemented in one exemplary system.

Figure 7:
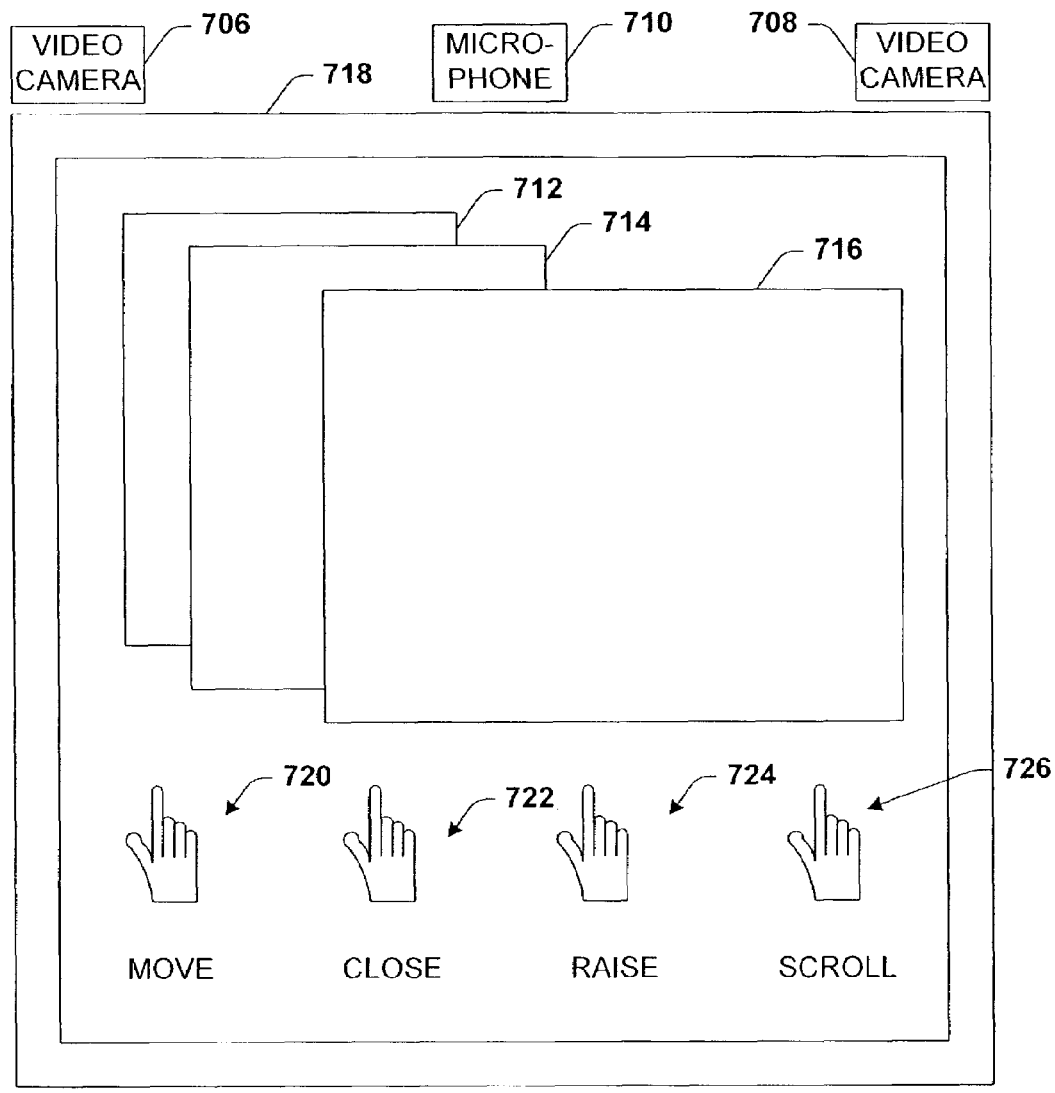
FIG. 7 illustrates an example of the hand gestures that the system may recognize and the visual feedback provided through the display, in accordance with an aspect of the present invention.
Figure 7:
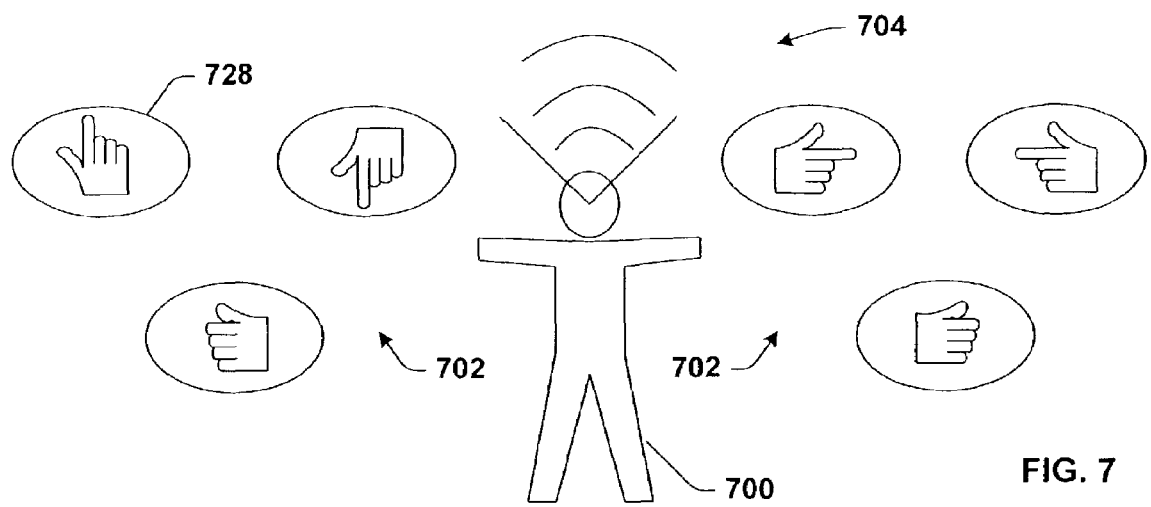

Referring now to FIG. 7, there is illustrated an example of gestures that the system recognizes, and further illustrates visual feedback provided to the system through the display. A user 700 gives commands by virtue of different hand gestures 702 and/or verbal commands 704. The gestures 702 are transmitted to a system computer (not shown) as part of the video images created by a pair of video cameras (706 and 708). Verbal and/or generally, audio commands, are input to the system computer through a microphone 710. Typical GUI windows 712, 714, and 716 are displayed in a layered presentation in an upper portion of display 718 while a lower portion of display 718 provides visual graphic feedback of in the fond of icons 720, 722, 724, and 726 of some of the gestures 702 recognized by the system.

In one example, the hand icon 720 is displayed when a corresponding gesture 728 is recognized. The name of the recognized command (Move) is also then displayed below the icon 720 to provide additional textual feedback to the user 700. Move and Raise commands may be recognized by dwelling on the window for a period of time. There is also a "flick" or "bump" command to send a window from one monitor to another monitor, in a multiple monitor configuration. This is controlled by moving the hand (or object) to the left or right, and is described in greater detail hereinbelow with respect to FIG. 9B. There are at least two ways to effect a Move; by speech recognition when voicing the word "Move", or phrase "Move Window", or any other associated voice command(s); and, by using the dwelling technique. It is appreciated that where more robust image capture and imaging processing systems are implemented, the pose of the hand may be mapped to any functionality, as described in greater detail below. Moreover, the shape of the hand icon may be changed in association with the captured hand pose to provide visual feedback to the user that the correct hand pose is being processed. However, as a basic implementation, the hand icon is positioned for selecting the window for interaction, or to move the window, or effect scrolling.

A Scroll command may be initiated first by voicing a corresponding command that is processed by speech recognition, and then using the hand (or object) to commence scrolling of the window by moving the hand (or object) up and down for the desired scroll direction.

In another example, the single displayed hand icon 720 is presented for all recognized hand gestures 702, however, the corresponding specific command name is displayed below the icon 720. Here, the same hand icon 720 is displayed in accordance with four different hand gestures utilized to indicate four different commands: Move, Close, Raise, and Scroll.

In still another aspect of the present invention, a different hand shaped icon is used for each specific command and the name of the command is optionally displayed below the command. In yet another embodiment, audio confirmation is provided by the computer, in addition to the displayed icon and optional command name displayed below the icon.

As previously mentioned, FIG. 7 illustrates the embodiment where a single hand shaped icon 720 is used, and the corresponding command recognized by the system is displayed below the icon 720. For example, when the system recognizes, either by virtue of gestures (with hand and/or object) and or verbal commands, the command to move a window, the icon 720 and corresponding command word "MOVE" are displayed by the display 718. Similarly, when the system recognizes a command to close a window, the icon 720 and corresponding command word "CLOSE" may be displayed by the display 718. Additional examples include, but are not limited to, displaying the icon 720 and corresponding command word "RAISE" when the system recognizes a hand gesture to bring a GUI window forward. When the system recognizes a hand gesture corresponding to a scroll command for scrolling a GUI window, the icon 720 and command word "SCROLL" are displayed by the display 718.

It is to be appreciated that the disclosed system may be configured to display any number and type of graphical icons in response to one or more hand gestures presented by the system user. Additionally, audio feedback may be used such that a beep to tone may be presented in addition to or in lieu of the graphical feedback. Furthermore the graphical icon may be used to provide feedback in the form of a color, combination of colors, and/or flashing color or colors. Feedback may also be provided by flashing a border of the selected window, the border in the direction of movement. For example, if the window is to be moved to the right, the right window border could be flashed to indicate the selected direction of window movement. In addition to or separate from, a corresponding tone frequency may be emitted to indicate direction of movement, e.g., an upward movement would have and associated high pitch and a downward movement would have a low pitch. Still further, rotational aspects may be provided such that movement to the left effects a counter-clockwise rotation of a move icon, or perhaps a leftward tilt in the GUI window in the direction of movement.

Figure 8:
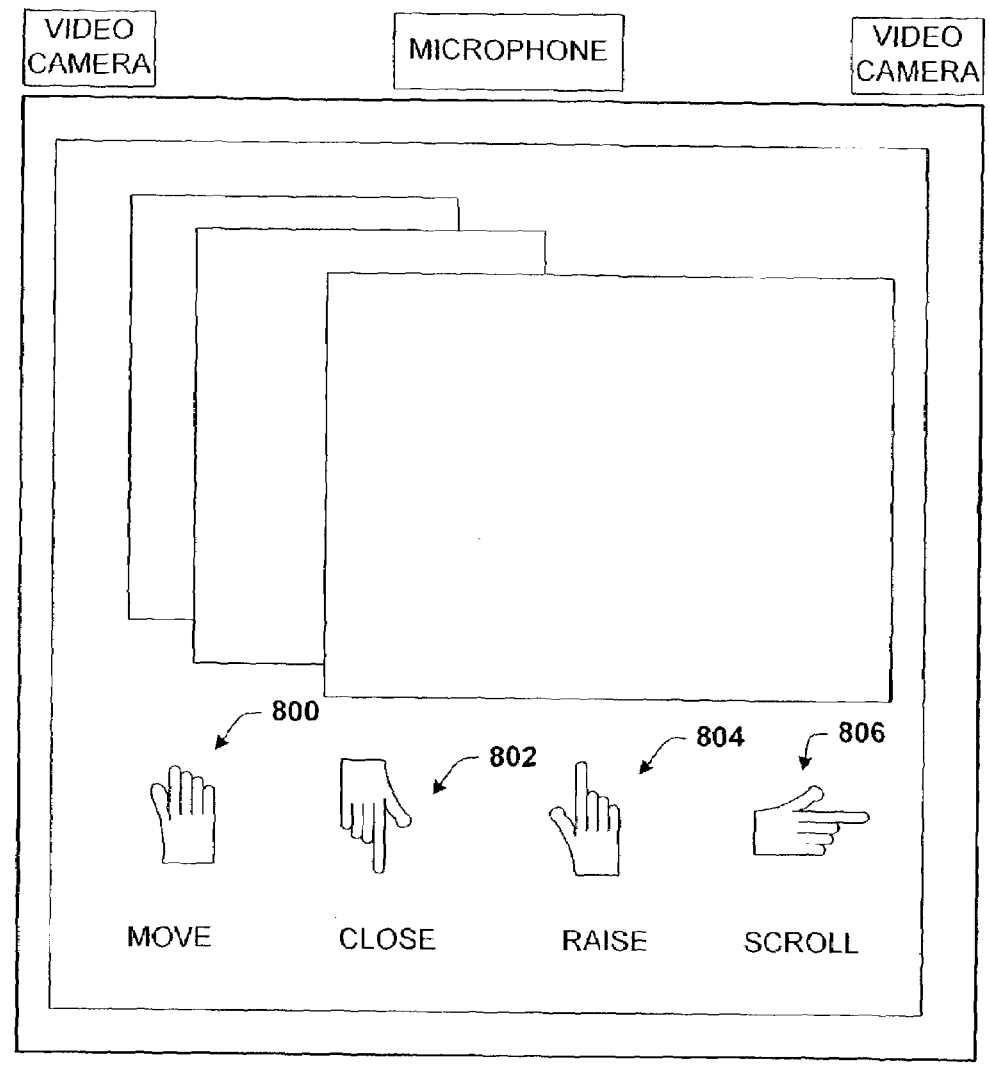
FIG. 8 illustrates an alternative embodiment wherein a unique icon is displayed in association with a name of a specific recognized command, in accordance with an aspect of the present invention.
Figure 8:
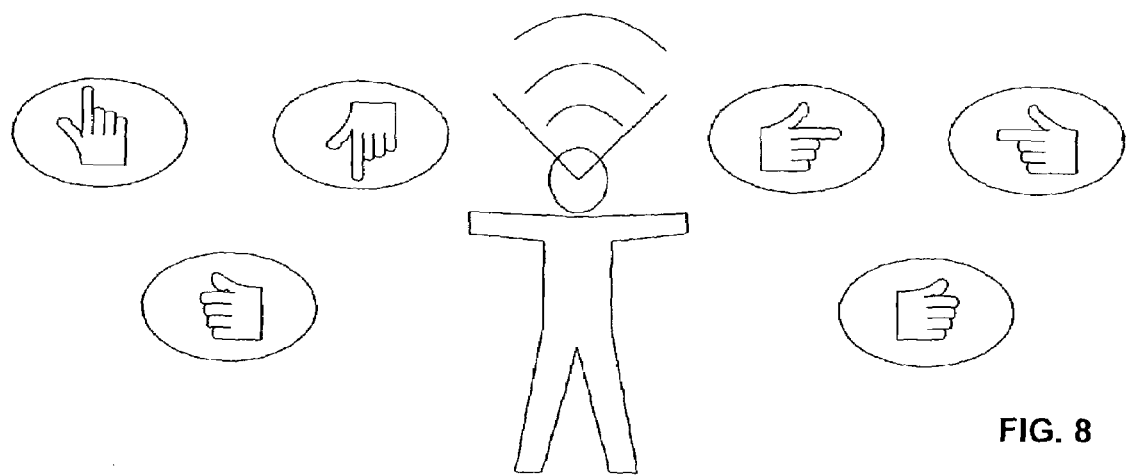

Referring now to FIG. 8, there is illustrated an alternative embodiment wherein a unique icon is displayed in association with a name of a specific recognized command, in accordance with an aspect of the present invention. Here, each icon-word pair is unique for each recognized command. Icon-word pairs 800, 802, 804, and 806 for the respective commands "MOVE", "CLOSE", "RAISE", and "SCROLL", are examples of visual feedback capabilities that can be provided.

The system is capable of interpreting commands based on interpreting hand gestures, verbal commands, or both in combination. A hand is identified as a moving object by the motion detection algorithms and the hand movement is tracked and interpreted. In accordance with one aspect of the invention, hand gestures and verbal commands are used cooperatively. Speech recognition is performed using suitable voice recognition applications, for example, Microsoft SAPI 5.1, with a simple command and control grammar. However, it is understood that any similar speech recognition system can be used. An inexpensive microphone is placed near the display to receive audio input. However, the microphone can be placed at any location insofar as audio signals can be received thereinto and processed by the system.

Following is an example of functionality that is achieved by combining hand gesture and verbal modalities. Interaction with the system can be initiated by a user moving a hand across an engagement plane and into an engagement volume.

Figure 9A:
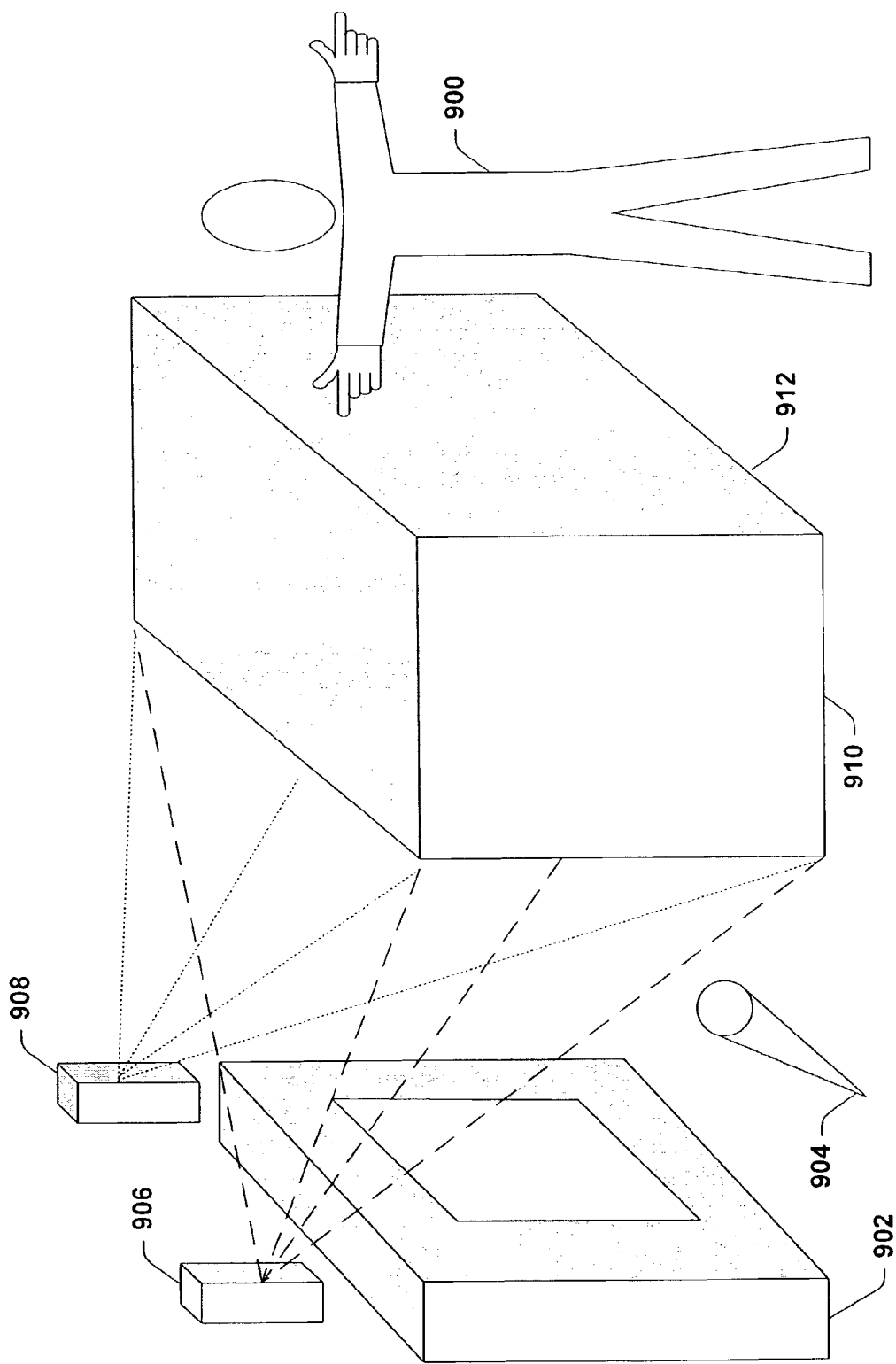
FIGS. 9A and 9B illustrate an engagement plane and volume of both single and multiple monitor implementations, in accordance with an aspect of the present invention.

Referring now to FIG. 9A, there is illustrated the engagement plane and engagement volume for a single monitor system of the present invention. A user 900 is located generally in front of a display 902, which is also within the imaging capabilities of a pair of cameras (906 and 908). A microphone 904 (similar to microphones 206 and 710) is suitably located such that user voice signals are input for processing, e.g., in front of the display 902. The cameras (906 and 908, similar to cameras 200 and, 706 and 708) are mounted substantially parallel to each other and on a horizontal plane above the display 902. The two video cameras (906 and 908) are separated by a distance that provides optimum detection and tracking for the given cameras and the engagement volume. However, it is to be appreciated that cameras suitable for wider fields of view, higher resolution, may be placed further apart on a plane different from the top of the display 902, for example, lower and along the sides of the display facing upwards, to capture gesture images for processing in accordance with novel aspects of the present invention. In accordance therewith, more robust image processing capabilities and hypothesis engines can be employed in the system to process greater amounts of data.

Between the display 902 and the user 900 is a volume 910 defined as the engagement volume. The system detects and tracks objects inside and outside of the volume 910 to determine the depth of one or more objects with respect to the engagement volume 910. However, those objects determined to be of a depth that is outside of the volume 910 will be ignored. As mentioned hereinabove, the engagement volume 910 is typically defined to be located where the hands and/or objects in the hands of the user 900 are most typically situated, i.e., above a keyboard of the computer system and in front of the cameras (906 and 908) between the user 900 and the display 902 (provided the user 900 is seated in front of the display on which the cameras (906 and 908) are located). However, is it appreciated that the user 900 may be standing while controlling the computer, which requires that the volume 910 be located accordingly to facilitate interface interaction. Furthermore, the objects may include not only the hand(s) of the user, or objects in the hand(s), but other parts of the body, such as head, torso movement, aims, or any other detectable objects. This is described in greater detail hereinbelow.

A plane 912 defines a face of the volume 910 that is closest to the user 900, and is called the engagement plane. The user 900 may effect control of the system by moving a hand (or object) through the engagement plane 912 and into the engagement volume 910. However, as noted above, the hand of the user 900 is detected and tracked even when outside the engagement volume 910. However, it would be ignored when outside of the engagement volume 910 insofar as control of the computer is concerned. When the object is moved across the engagement plane 912, feedback is provided to the user in the form of displaying an alpha-blended icon on the display (e.g., an operating system desktop). The icon is designed to be perceived as distinct from other desktop icons and may be viewed as an area cursor. The engagement plane 912 is positioned such that the user's hands do not enter it during normal use of the keyboard and mouse. When the system engages the hand or object, the corresponding hand icon displayed on the desktop is moved to reflect the position of the tracked object (or hand).

The engagement and acquisition of the moving hand (or object) is implemented in the lightweight sparse stereo system by looking for the object with a depth that is less than a predetermined distance value. Any such object will be considered the command object until it is moved out of the engagement volume 910, for example, behind the engagement plane 912, or until the hand (or object) is otherwise removed from being a tracked object. In one example, the specified distance is twenty inches.

In operation, the user 900 moves a hand through the engagement plane 912 and into the engagement volume 910 established for the system. The system detects the hand, tracks the hand as the hand moves from outside of the volume 910 to the inside, and provides feedback by displaying a corresponding hand shaped icon on the display 902. The open microphone 904 placed near the display 902 provides means for the user 900 to invoke one or more verbal commands in order to act upon the selected window under the icon. The window directly underneath the hand shaped icon is the selected window. When a spoken and/or audio command is input to and understood by the system, the interpreted command is displayed along with the hand shaped icon. For example, in one embodiment, by speaking the word "Move", the user may initiate the continuous (or stepped) movement of the window under the hand shaped icon to follow the movement of the user's hand. The user 900 causes the selected window to move up or down within the display 902 by moving the hand up or down. Lateral motion is also similarly achieved. Movement of the window is terminated when the user hand is moved across the engagement plane 912 and out of the engagement volume 910. Other methods of termination include stopping movement of the hand (or object) for an extended period of time, which is processed by the system as a command to drop the associated hypothesis. Furthermore, as described hereinabove, the Move command may be invoked by dwelling the hand on the window for a period of time, followed by hand motion to initiate the direction of window movement.

Alternatively, the user may speak the word "Release" and the system will stop moving the selected window in response to the user's hand motion. Release may also be accomplished by dwelling a bit longer in time while in Move, and/or Scroll modes. The user 900 may also act upon a selected window with other actions. By speaking the words "Close", "Minimize", or "Maximize" the selected window is respectively closed, minimized or maximized. By speaking the word "Raise", the selected window is brought to the foreground, and by speaking "Send to Back", the selected window is sent behind (to the background) all other open windows. By speaking "Scroll", the user initiates a scrolling mode on the selected window. The user may control the rate of the scroll by the position of the hand. The hand shaped icon tracks the user's hand position, and the rate of the scrolling of the selected window is proportional to the distance between the current hand icon position and the position of the hand icon at the time the scrolling is initiated. Scrolling can be terminated by the user speaking "Release" or by the user moving their hand behind the engagement plane and out of the engagement volume. These are just a few examples of the voice recognition perceptual computer control capabilities of the disclosed architecture. It is to be appreciated that these voiced commands may also be programmed for execution in response to one or more object movements in accordance with the present invention.

In accordance with another aspect of the invention, dwell time can be used as a modality to control windows in lieu of, or in addition to, verbal commands and other disclosed modalities. Dwell time is defined as the time, after having engaged the system, that the user holds their hand position stationary such that the system hand shaped icon remains over a particular window. For example, by dwelling on a selected window for a short period of time (e.g., two seconds), the system can bring the window to the foreground of all other open windows (i.e., a RAISE command). Similarly, by dwelling a short time longer (e.g., four seconds), the system will grab (or select for dragging) the window, and the user causes the selected window to move up or down within the display by moving a hand up or down (i.e., a MOVE command). Lateral motion is also similarly achieved. Additional control over GUI windows can be accomplished in a similar fashion by controlling the dwell time of the hand shaped icon over the open window.

In accordance with a more robust aspect of the invention, hand gestures are interpreted by hand motion or by pattern recognition. For example, the user can bring the window to the front (or foreground), on top of all other open windows by moving a hand from a position closer to the display to position farther from the display, the hand remaining in the engagement volume 910. Similarly, the user can cause the selected window to be grabbed and moved by bringing fingers together with their thumb, and subsequently moving the hand. The selected window will move in relation to the user hand movement until the hand is opened up to release the selected window. Additional control over the selected window can be defined in response to particular hand movements or hand gestures. In accordance with another aspect of the present invention, the selected window will move in response to the user pointing their hand, thumb, or finger in a particular direction. For example, if the user points their index finger to right, the window will move to the right within the display. Similarly, if the user points to the left, up, or down the selected window will move to the left, up or down within the display, respectively. Additional window controls can be achieved through the use of similar hand gestures or motions.

In accordance with another aspect of the invention, the system is configurable such that an individual user selects the particular hand gestures that they wish to associate with particular commands. The system provides default settings that map a given set of gestures to a given set of commands. This mapping, however, is configurable such that the specific command executed in response to each particular hand gesture is definable by each user. For example, one user may wish to point directly at the screen with their index finger to grab the selected window for movement while another user may wish to bring their fingers together with their thumb to grab the selected window. Similarly, one user may wish to point a group of finger up or down in order to move a selected window up or down, while another user may wish to open the palm of their hand toward the cameras and then move their opened hand up or down to move a selected window up or down. All given gestures and commands are configurable by the individual users to best suit that particular user's individual personal preferences.

Similarly, in accordance with another aspect of the present invention, the system may include a "Record and Define Gesture" mode. In the "Record and Define Gesture" mode, the system records hand gestures performed by the user. The recorded gestures are then stored in the system memory to be recognized during normal operation. The given hand gestures are then associated with a particular command to be performed by the system in response to that particular hand gesture. With such capability, a user may further tailor the system to their personal preference or, similarly, may tailor system operation to respond to specific commands most appropriate for particular applications.

In a similar fashion, the user can choose the particular words, from a given set, they wish to use for a particular command. For example, one user may choose to say "Release" to stop moving a window while another may wish to say "Quit". This capability allows different users, which may prefer to use different words for a given command, the ability to tailor the system in a way most efficient for their personal use.

The present invention can be utilized in an expansive list of applications. The following discussion is exemplary of only a few applications with which the present invention may be utilized. One such application is associated with user control of a presentation, or similar type of briefing application, wherein the user makes a presentation on a projection type screen to a group of listeners.

Figure 9B:
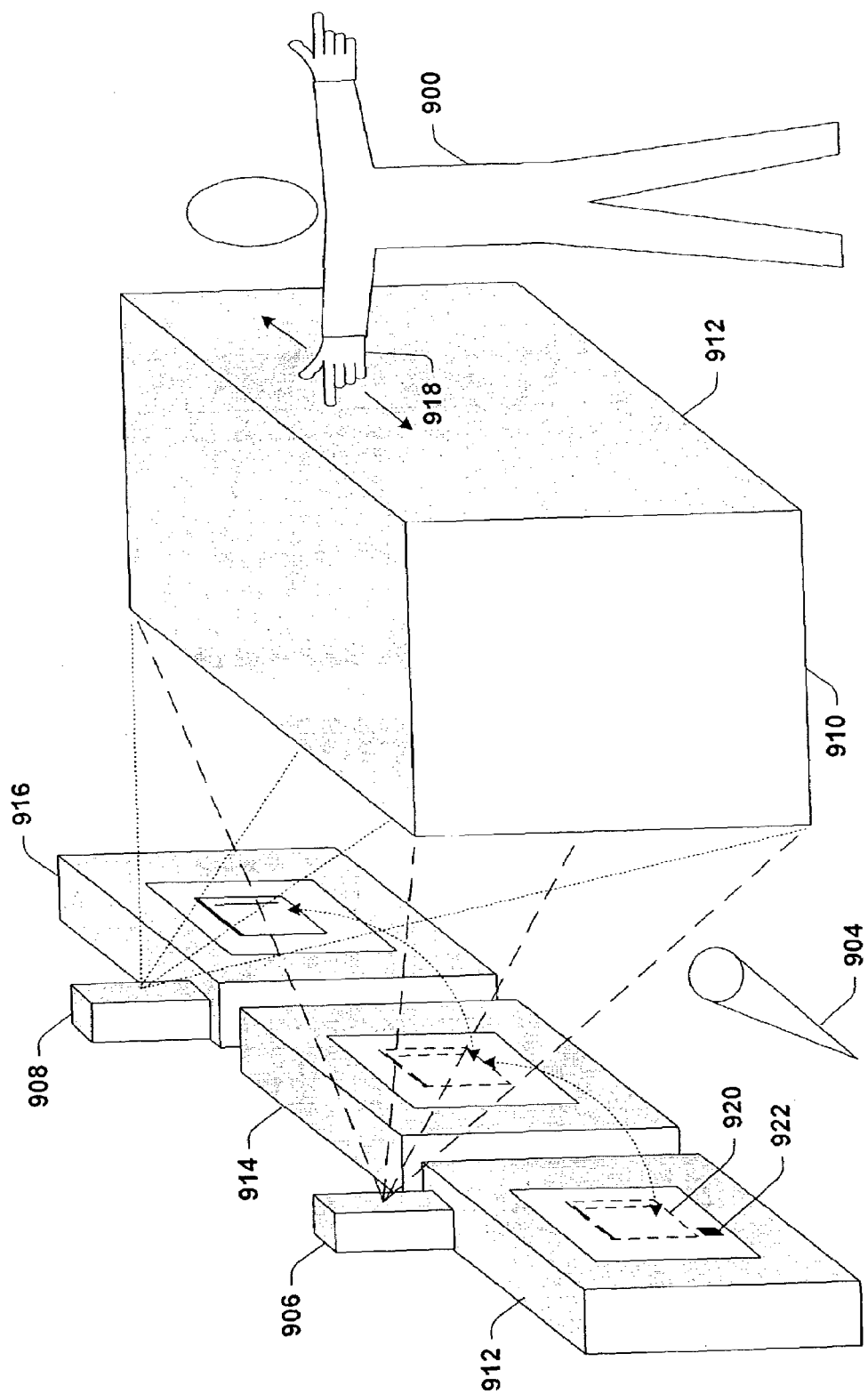

Referring now to FIG. 9B, there is illustrated a multiple monitor implementation. Here, the system includes three monitors (or displays) through which the user 900 exercises control of GUI features; a first display 912, a second display 914, and a third display 916. The cameras (906 and 908) are similarly situated as in FIG. 9A, to define the engagement volume 910. By utilizing the "flick" or "bump" motion(s) as performed by a hand 918 of the user 900, the user 900 can move a window 920 from the first display 912 to the second display 914, and further from the second display 914 to the third display 916. The flick motion of the user hand 918 can effect movement of the window 920 from the first display 912 to the third display 916 in a single window movement, or in multiple steps through the displays (914 and 916) using corresponding multiple hand motions. Of course, control by the user 900 occurs only when the user hand 918 breaks the engagement plane 912, and is determined to be a control object (i.e., an object meeting parameters sufficient to effect control of the computer).

As mentioned hereinabove, the user 900 is located generally in front of the displays (912, 914, and 916), which is also within the imaging capabilities of the pair of cameras (906 and 908). The microphone 904 is suitably located to receive user voice signals. The cameras (906 and 908) are mounted substantially parallel to each other and on a horizontal plane above the displays (912, 914, and 916), and separated by a distance that provides optimum detection and tracking for the given cameras and the engagement volume 910.

In operation, the user 900 moves the hand 918 through the engagement plane 912 and into the engagement volume 910 established for the system. The system, which had detected and tracked the hand 918 before it entered the volume 912, begins providing feedback to the user 900 by displaying the hand shaped icon 922 on one of the displays (912, 914, and 916). The microphone 904 provides additional means for the user 900 to invoke one or more verbal commands in order to act upon the selected window 920 under the corresponding icon 922. The window 920 directly underneath the hand shaped icon is the selected window. When the user hand 918 enters the volume 910, it is recognized as a control object. The corresponding icon 922 is presented by the system on the computer display 912. By dwelling a predetermined amount of time, the associated window is assigned for control. The user 900 causes the selected window to move up or down within the display by invoking the 'Move' command as explained above and then moving the hand up or down, or to move across one or more of the monitors (914 and 916) by invoking the 'Flick' command and then using the flick hand motion. Of course, if the second display 914 was the initial point of control, the user 900 can cause the window 920 to be moved left to the first display 912, or right to the third display 916. Movement of the window is terminated (or "released") when the user hand dwells for a time longer than a predetermined dwell time, or out of the engagement volume 910.

Alternatively, the user may speak the word "Release" and the system will stop moving the selected window in response to the user's hand motion. Release may also be accomplished by dwelling a bit while in Move, and/or Scroll modes. The user may also act upon a selected window with other actions. By speaking the words "Close", "Minimize", or "Maximize" the selected window is respectively closed, minimized or maximized. By speaking the word "Raise", the selected window is brought to the foreground, and by speaking "Send to Back", the selected window is sent behind (to the background) all other open windows. By speaking "Scroll", the user initiates a scrolling mode on the selected window. The user may control the rate of the scroll by the position of the hand. The hand shaped icon tracks the user's hand position, and the rate of the scrolling of the selected window is proportional to the distance between the current hand icon position and the position of the hand icon at the time the scrolling is initiated. Scrolling can be terminated by the user speaking "Release" or by the user moving their hand behind the engagement plane and out of the engagement volume. These are just a few examples of the voice recognition perceptual computer control capabilities of the disclosed architecture.

Figure 10:
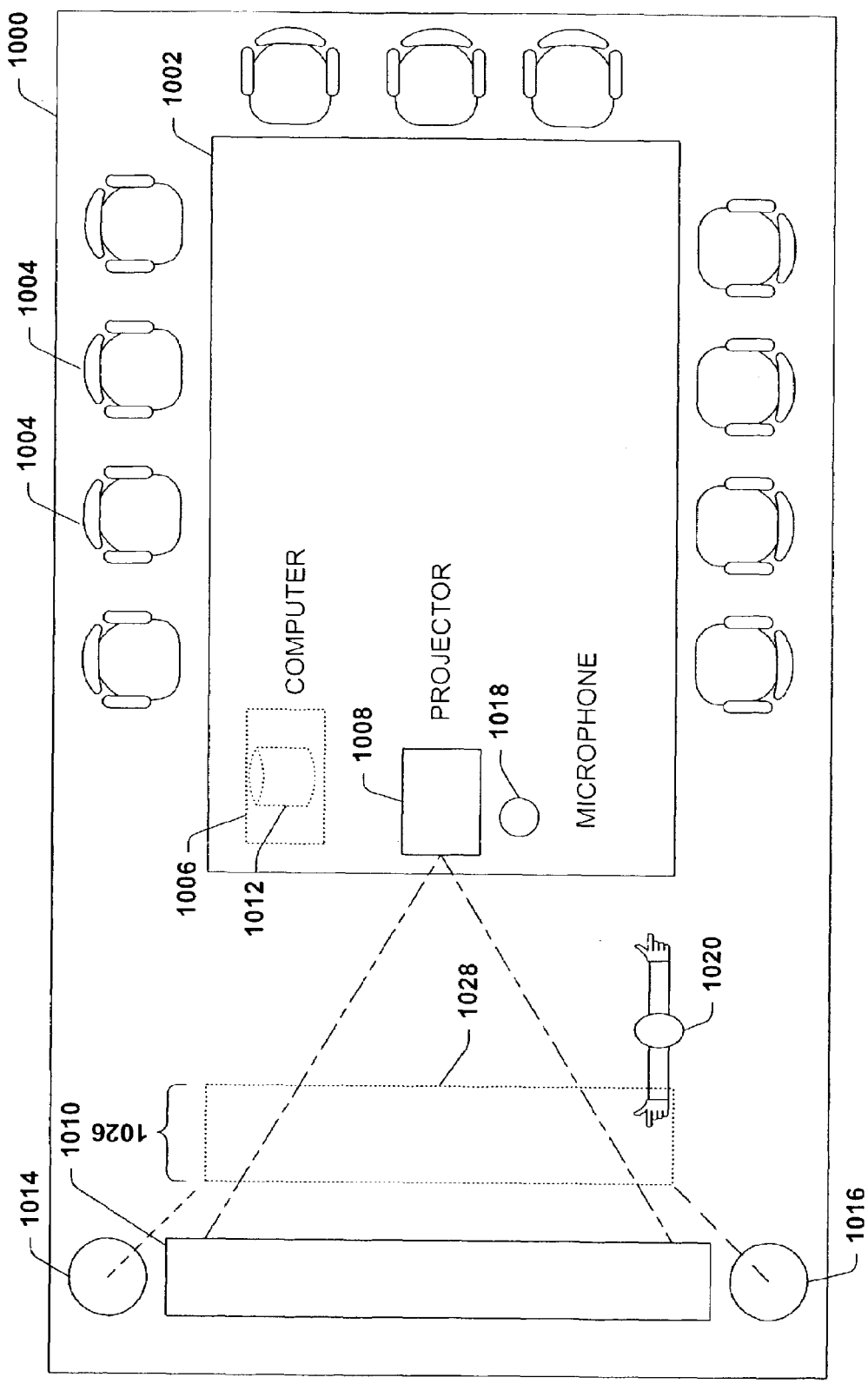
FIG. 10 illustrates a briefing room environment where gestures are utilized to control a screen projector via a computer system configured in accordance with an aspect of the present invention.

Referring now to FIG. 10, there is illustrated a briefing room environment where voice and/or gestures are utilized to control a screen projector via a computer system configured in accordance with an aspect of the present invention. The briefing room 1000 comprises a large briefing table 1002 surrounded on three sides by numerous chairs 1004, a computer 1006, a video projector 1008, and a projector screen 1010. Utilization of the present invention adds additional elements comprising the disclosed perceptual software 1012, two video cameras (1014 and 1016) and a microphone 1018. In this application, a user 1020 is positioned between the projector screen 1010 and briefing table 1002 at which the audience is seated. A top face 1022 of an engagement volume 1024 is defined by rectangular area 1026. Similarly, a front surface indicated at 1028 represents an engagement plane.

As the user gives the presentation, the user controls the content displayed on the projection screen 1010 and advancement of the slides (or presentation images) by moving their hand(s) through the engagement plane 1028 into the engagement volume 1024, and/or speaking commands recognizable by the system. Once inside the engagement volume 1024, a simple gesture is made to advance to the next slide, back-up to a previous slide, initiate an embedded video, or to effect one of a number of many other presentation capabilities.

A similar capability can be implemented for a home media center wherein the user can change selected video sources, change channels, control volume, advance chapter and other similar functions by moving their hand across an engagement plane into an engagement volume and subsequently performing the appropriate hand gesture. Additional applications include perceptual interfaces for TabletPCs, Media center PCs, kiosks, hand held computers, home appliances, video games, and wall sized displays, along with many others.

It is appreciated that in more robust implementations, instead of the engagement volume being fixed at a position associated with the location of the cameras that requires the presenter to operate according to the location of the engagement volume, the system can be configured such that the engagement volume travels with the user (in a "roaming" mode) as the user moves about the room. Thus the cameras would be mounted on a platform that rotates such that the rotation maintains the cameras substantially equidistant from the presenter. The presenter may carrier a sensor that allows the system to sense or track the general location of the presenter. The system would then affect rotation of the camera mount to "point" the cameras at the presenter. In response thereto, the engagement volume may be extended to the presenter allowing control of the computer system as the presenter moves about. The process of "extending" the engagement volume can include increasing the depth of the volume such that the engagement plane surface moves to the presenter, or by maintaining the volume dimensions, but moving the fixed volume to the presenter. This would require on-thefly focal adjustment of the cameras to track quick movements in the depth of objects in the volume, but also the movement of the presenter.

Another method of triggering system attention in this mode would be to execute a predefined gesture that is not likely to be made unintentionally, e.g., raising a hand.

Figure 11:
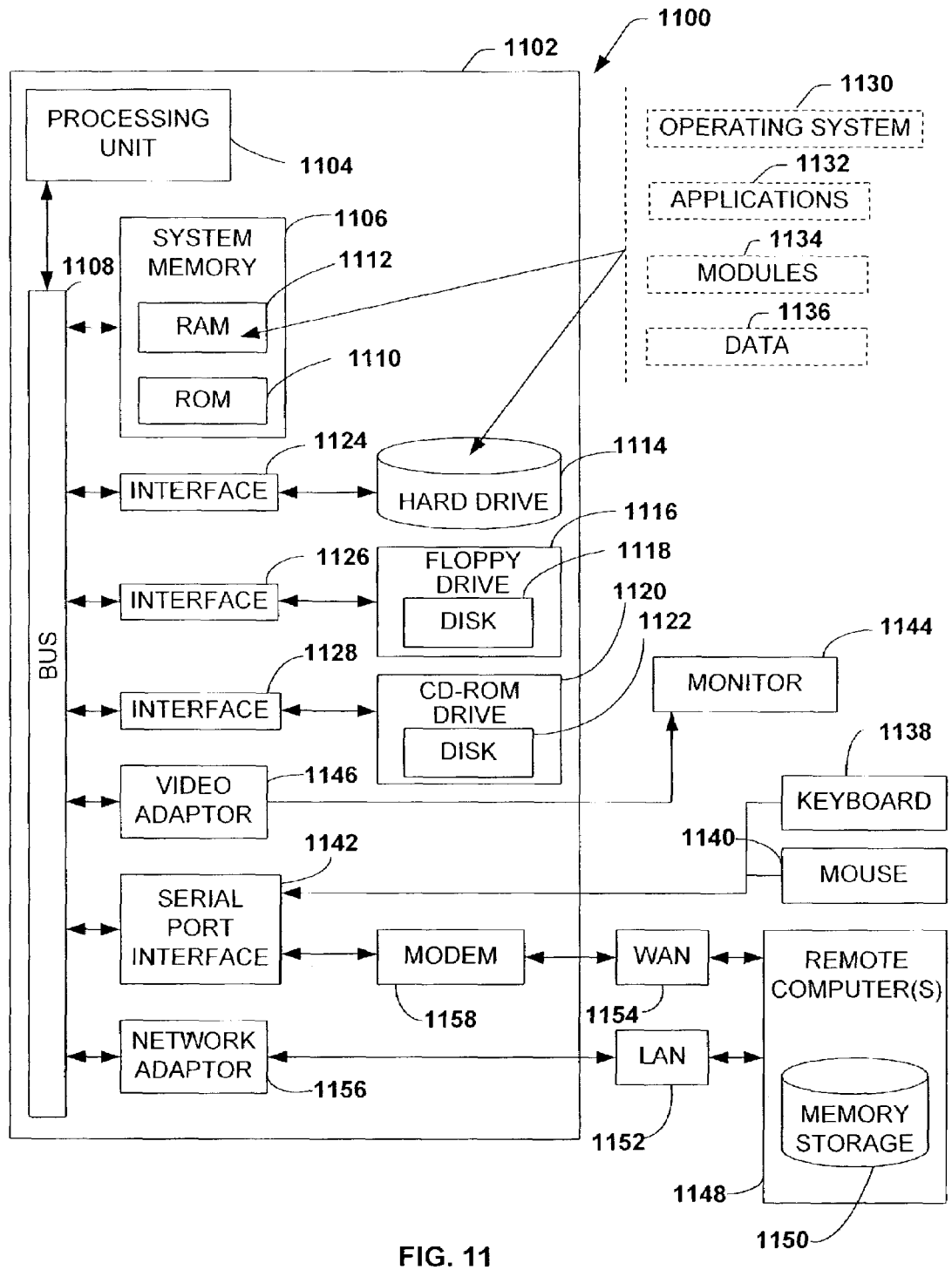
FIG. 11 illustrates a block diagram of a computer system operable to execute the present invention.

It is also appreciated that the system is configurable for individual preferences such that the engagement volume of a first user may be different than the volume of a second user. For example, in accordance with a user login, or other unique user information, the user preferences may be retrieved and implemented automatically by the system. This can include automatically elevating the mounted cameras, for a taller person by using a telescoping camera stand so that the cameras are at the appropriate height of the particular user, whether sitting or standing. This also includes, but is not limited to, setting the system for "roaming" mode Referring now to FIG. 11, there is illustrated a block diagram of a computer operable to execute the present invention. In order to provide additional context for various aspects of the present invention, FIG. 11 and the following discussion are intended to provide a brief, general description of a suitable computing environment 1100 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc., that perform particular tasks or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference again to FIG. 11, the exemplary environment 1100 for implementing various aspects of the invention includes a computer 1102, the computer 1102 including a processing unit 1104, a system memory 1106, and a system bus 1108. The system bus 1108 couples system components including, but not limited to the system memory 1106 to the processing unit 1104. The processing unit 1104 may be any of various commercially available processors. Dual microprocessors and other multi-processor architectures also can be employed as the processing unit 1104.

The system bus 1108 can be any of several types of bus structure including a memory bus or memory controller, a peripheral bus, and a local bus using any of a variety of commercially available bus architectures. The system memory 1106 includes read only memory (ROM) 1110 and random access memory (RAM) 1112. A basic input/output system (BIOS), containing the basic routines that help to transfer information between elements within the computer 1102, such as during start-up, is stored in the ROM 1110.

The computer 1102 further includes a hard disk drive 1114, a magnetic disk drive 1116, (e.g., to read from or write to a removable disk 1118) and an optical disk drive 1120, (e.g., reading a CD-ROM disk 1122 or to read from or write to other optical media). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The drives and their associated computer-readable media provide nonvolatile storage of data, data structures, computer-executable instructions, and so forth. For the computer 1102, the drives and media accommodate the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, cartridges, and the like, may also be used in the exemplary operating environment, and further that any such media may contain computer-executable instructions for performing the methods of the present invention.

A number of program modules can be stored in the drives and RAM 1112, including an operating system 1130, one or more application programs 1132, other program modules 1134 and program data 1136. It is appreciated that the present invention can be implemented with various commercially available operating systems or combinations of operating systems.

A user can enter commands and information into the computer 1102 through a keyboard 1138 and a pointing device, such as a mouse 1140. Other input devices (not shown) may include one or more video cameras, one or microphones, an IR remote control, a joystick, a game pad, a satellite dish, a scanner, or the like. These and other input devices are often connected to the processing unit 1104 through a serial port interface 1142 that is coupled to the system bus 1108, but may be connected by other interfaces, such as a parallel port, a game port, a firewire port, a universal serial bus ("USB"), an IR interface, etc. A monitor 1144 or other type of display device is also connected to the system bus 1108 via an interface, such as a video adapter 1146. In addition to the monitor 1144, a computer typically includes other peripheral output devices (not shown), such as speakers, printers etc.

The computer 1102 may operate in a networked environment using logical connections to one or more remote computers, such as a remote computer(s) 1148. The remote computer(s) 1148 may be a workstation, a server computer, a router, a personal computer, portable computer, microprocessor-based entertainment appliance, a peer device or other common network node, and typically includes many or all of the elements described relative to the computer 1102, although, for purposes of brevity, only a memory storage device 1150 is illustrated. The logical connections depicted include a LAN 1152 and a WAN 1154. Such networking environments are commonplace in offices, enterprise-wide computer networks, intranets and the Internet.

When used in a LAN networking environment, the computer 1102 is connected to the local network 1152 through a network interface or adapter 1156. When used in a WAN networking environment, the computer 1102 typically includes a modem 1158, or is connected to a communications server on the LAN, or has other means for establishing communications over the WAN 1154, such as the Internet. The modem 1158, which may be internal or external, is connected to the system bus 1108 via the serial port interface 1142. In a networked environment, program modules depicted relative to the computer 1102, or portions thereof, may be stored in the remote memory storage device 1150. It will be appreciated that the network connections shown are exemplary and other means of establishing a communications link between the computers may be used.

Figure 12:
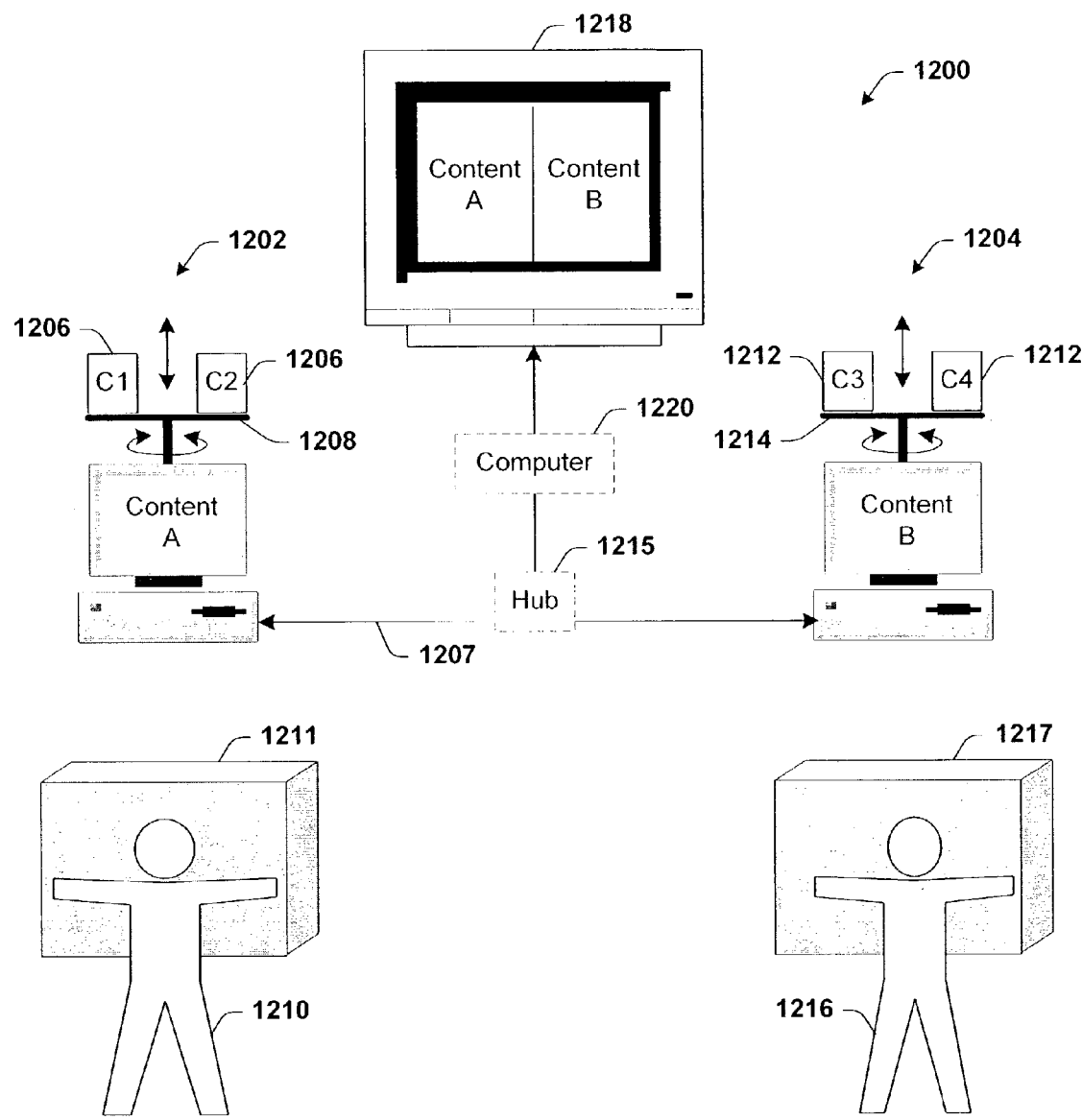
FIG. 12 illustrates a network implementation of the present invention.

Referring now to FIG. 12, there is illustrated a network implementation 1200 of the present invention. The implementation 1200 includes a first perceptual system 1202 and a second perceptual system 1204, both operational according to the disclose invention. The first system 1202 includes cameras 1206 (also denoted C1 and C2) mounted on a rotational and telescoping camera mount 1208. A first user 1210 located generally in front of the first system 1202 effects control of a GUI content A of the first system 1202 in accordance with the novel aspects of the present invention by introducing hand gestures into an engagement volume 1211 and/or voice signals. The first user 1210 may rove about in front of the cameras 1206 in accordance with the "roaming" operational mode described previously, or may be seated in front of the cameras 1206. The second system 1204 includes cameras 1212 (also denoted C3 and C4) mounted on a rotational and telescoping camera mount 1214. A second user 1216 located generally in front of the second system 1204 effects control of a GUI content B of the second system 1204 in accordance with the novel aspects of the present invention by introducing hand gestures into an engagement volume 1217 and/or voice signals. The second user 1216 may rove about in front of the cameras 1212 in accordance with the "roaming" operational mode described previously, or may be seated in front of the cameras 1212.

The first and second systems (1202 and 1204) may be networked in a conventional wired or wireless network 1207 peer configuration (or bus configuration by using a hub 1215). This particular system 1200 is employed to present both content A and content B via a single large monitor or display 1218. Thus the monitor 1218 can be driven by either of the systems (1202 and 1204), as can be provided by conventional dual-output video graphics cards, or the separate video information may be transmitted to a third monitor control system 1220 to present the content. Such an implementation finds application where a side-by-side comparison of product features is being presented, other similar applications where two or more users may desire to interact. Thus content A and content B may be presented on a split screen layout of the monitor 1218. Either or both user 1210 and 1216 may provide keyboard and/or mouse input to facilitate control according to the present invention.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates a user interface, comprising at least a processor executing the following components stored in a computer memory:
    a tracking component that detects at least one of a plurality of objects within a scene and tracks at least one respective moving object selected from the plurality of objects if the respective object lies within the scene while the object is ignored when it lies outside the scene, detection of the object is based at least in part upon image comparison of a plurality of images relative to a course mapping of the images, the tracking component employs multiple object hypotheses utilizing multiple trackers comprising at least a first tracker and a second tracker to select and track the at least one moving object from the plurality of objects based on one or more criteria such that the second tracker continues to track the at least one moving object upon failure of the first tracker to track the at least one moving object, wherein the multiple object hypotheses are supported by frame-to-frame tracking through time in at least one view and stereo matching across two views, and wherein redundancy among the trackers is recognized by distance analysis, such that if a distance between the at least one moving object and a second moving object falls below a threshold distance the second object is removed from consideration;
    a seeding component that iteratively seeds the tracking component with the object hypotheses based upon the presence of the object and the image comparison; and
    a filtering component that selectively removes the tracked object from the object hypotheses or at least one object hypothesis from the object hypotheses, the tracked object removed based at least in part upon a region-based approach in determining depth to cursors and move windows.

2. The system of claim 1, the tracking component tracks the respective object according to predetermined criteria relating to object characteristics comprising at least one of object motion, object orientation, object features, and object rotation.

3. The system of claim 1, the tracking component tracking the object only if motion of the object meets a minimum threshold when the object is present within the scene.

4. The system of claim 1, the scene comprising a volume in space.

5. The system of claim 1, the tracking component detecting the object utilizing an imaging system comprising at least one imager.

6. The system of claim 1, the tracking component detecting the object utilizing an imaging system comprising at least two cameras whose rasters are in parallel.

7. The system of claim 1, the object being a hand of at least one user.

8. The system of claim 7, the hand controlled to provide at least one of a plurality of hand gestures that are detected and tracked by the tracking component.

9. The system of claim 8, the hand gestures comprising gesture characteristics detectable by the tracking component, which gesture characteristics include at least one of hand movement, finger count, finger orientation, hand orientation, and hand rotation.

10. The system of claim 1, the tracking component tracking the object in the scene by performing a frame comparison of frame images of the object over time.

11. The system of claim 1, the tracking component predicting the next location of the object.

12. The system of claim 1, a system processing device input data used in cooperation with the tracking component tracking the object.

13. The system of claim 12, the device input data including keyboard input data, mouse input data, and audio input data.

14. The system of claim 1, at least one of the tracking component and the filtering component including a support vector machine for classifying the object characteristics.

15. The system of claim 1, further comprising a user interface component for presenting a graphical response to a tracked object.

16. A system that facilitates a user interaction with a perceptual user interface, comprising at least a processor executing the following means:
  means for tracking and detecting at least one of a plurality of objects within a scene based at least in part upon image comparison of a plurality of images relative to a course mapping of the images, the means for tracking and detecting runs multiple object hypotheses utilizing multiple trackers comprising at least a first tracker and a second tracker for tracking at least one moving object from the plurality of objects within the scene such that a second tracker tracks the at least one moving object upon failure of a first tracker to track the at least one moving object, wherein the multiple object hypotheses are supported by frame-to-frame tracking through time in at least one view and stereo matching across two views, wherein redundancy among the trackers is implemented by distance analysis, based on distance between the object and a second moving object, and wherein when the distance falls below a threshold distance the second object is removed from consideration;
  means for storing the multiple object hypotheses;
  means for iteratively seeding the tracking component with object hypotheses based upon the presence of the object characteristics and the image comparison; and
  means for filtering that selectively removes the tracked object from the object hypotheses and at least one object hypothesis from the set of object hypotheses, the tracked object removed based at least in part upon a region-based approach in determining depth to cursors and move windows.

17. A system that facilitates a user interface, comprising at least a processor executing the following components stored in a computer memory:
  a detecting component that detects at least one of a plurality of objects within a scene;
  a tracking component that tracks a detected object wherein the detected object is selected for tracking by employing multiple hypotheses on the plurality of objects within the scene wherein at least two trackers are utilized to track the detected object such that a second tracker continues tracking the detected object upon failure of a first tracker, wherein the multiple hypotheses are supported by frame-to-frame tracking through time in at least one view and stereo matching across two views, and wherein redundancy between the at least two trackers is recognized by distance analysis such that when a distance between the detected object and a second moving object falls below a threshold distance the second object is removed from consideration;
  a seeding component that iteratively seeds the tracking component with object hypotheses based upon the detected object that is tracked;
  a filtering component that selectively removes the tracked object from the object hypotheses or at least one object hypothesis from the set of object hypotheses; and
  an interpreting component that interprets an object characteristic of the tracked object and executes a command in response thereto.

18. The system of claim 17, the tracking component comprising a prediction algorithm to predict a next position of a tracked object of an object hypothesis.

19. The system of claim 18, the prediction algorithm comprising a Kalman filter.

20. The system of claim 17, the tracking component selecting a narrow range of points centered on the predicted next position to which a second algorithm is applied to calculate an actual next position.

21. The system of claim 20, the second algorithm determining an actual position by finding a location $(u_t, v_t)$, within the narrow range that minimizes the sum of the absolute difference algorithm according to, $$SAD(I_{t-1}, u_{t-1}, v_{t-1}, I_t, u_t, v_t)$$

where $I_{t-1}$ refers to an image at time t−1, and $I_t$ refers to an image at time t, and where $(u_t, v_t)$ refers to a location at time t.

22. The system of claim 17, the object hypotheses maintained by frame-to-frame tracking through time in one of two views and stereo matching across both views.

23. The system of claim 17, the plurality of objects including a dominant object and a non-dominant object that are used to describe a spatial relationship.

24. The system of claim 17, further comprising the utilization of speech recognition to effect control of the system either separately or in combination with the detected object that is being tracked.

25. A computer system that facilitates interaction with a user, comprising a processor executing the following components stored in computer memory:
  an object processing system for processing object information of one or more objects in a scene, the object processing system including:
    a tracking component that at least tracks the one or more objects selected by running a set of multiple hypotheses on a plurality of moving objects detected within an engagement volume, where multiple trackers comprising at least a first and second tracker are utilized to simultaneously track at least one object from the one or more tracked objects such that the second tracker continues to track the at least one object upon failure of the first tracker to track the at least one object, wherein the set of multiple hypotheses are supported by frame-to-frame tracking through time in at least one view and stereo matching across two views, and wherein when a distance between the at least an object and a second moving object falls below a threshold distance the second object is removed from consideration on an assumption that trackers tracking the at least an object and the second moving object are tracking a single object;
    a seeding component that iteratively seeds the tracking component with object hypotheses based upon the objects that are tracked;
    a filtering component that selectively removes one or more of the tracked objects and corresponding object hypothesis from the set of object hypotheses in accordance with predetermined criteria; and
    an interpreting component that interprets object characteristics of the at least an tracked object and causes a command to be executed in response thereto;
  an input system for receiving user input separately or in combination with the object processing system; and
  a presentation system for presenting information to the user in response to at least one of the command being executed and receiving user input via the input system.

26. The computer system of claim 25, the object processing system defining an engagement volume within the scene such that the engagement volume is automatically positioned proximate to the user.

27. The computer system of claim 25, the engagement volume automatically positioned proximate to the user as the user roams.

28. The computer system of claim 25, the object processing system defining the engagement volume within the scene such that the engagement volume automatically positioned according to predefined user preferences.

29. A network of computer systems according to claim 25.

30. The computer system of claim 25, the object processing system including a plurality of cameras for obtaining images of the one or more objects, the object hypotheses supported by frame-to-frame tracking through time and stereo matching of the images of the plurality of cameras.

31. A method of facilitating a human-computer interface, the method comprising:
   employing a processor to execute computer executable instructions stored in memory to perform the following acts:
      acquiring gesture characteristics of at least one of a plurality of gestures within a volume of space with an acquisition component, the gesture characteristics acquired based at least in part upon image comparison of a plurality of images relative to a course mapping of the images;
      selecting the at least one gesture by employing a set of multiple object hypotheses on the plurality of gestures within the volume of space, where multiple trackers are utilized to track each of one or more objects performing the gestures such that upon failure of a tracker to track at least one of the one or more objects, an alternate tracker continues to track the at least one object, wherein the set of multiple object hypotheses are supported by frame-to-frame tracking through time in at least one view and stereo matching across two views, and wherein when a distance between a tracked object and a second moving object falls below a threshold distance the second object is removed from consideration;
      iteratively seeding the acquisition component with at least one gesture hypothesis based upon the presence of the gesture characteristics in the volume of space and the image comparison; and
      programmatically controlling a graphical representation of a graphical interface in response to acquiring the at least one gesture.

32. The method of claim 31, further comprising processing device input signals in cooperation with the acquiring the gesture, which device input includes at least one of keyboard input, mouse input, and audio input.

33. The method of claim 31, the graphical representation is at least an icon and text.

* * * * *